(12) United States Patent
Przybylinski et al.

(10) Patent No.: US 9,073,295 B2
(45) Date of Patent: Jul. 7, 2015

(54) WOOD-PLASTIC COMPOSITES UTILIZING IONOMER CAPSTOCKS AND METHODS OF MANUFACTURE

(75) Inventors: James P. Przybylinski, St. Helena, CA (US); Douglas Mancosh, Warwick, RI (US)

(73) Assignee: FIBER COMPOSITES, LLC, Providence, RI (US)

( * ) Notice: Subject to any disclaimer, the term of this patent is extended or adjusted under 35 U.S.C. 154(b) by 1007 days.

(21) Appl. No.: 12/643,442

(22) Filed: Dec. 21, 2009

(65) Prior Publication Data
US 2010/0159213 A1 Jun. 24, 2010

Related U.S. Application Data

(60) Provisional application No. 61/139,205, filed on Dec. 19, 2008.

(51) Int. Cl.
| | |
|---|---|
| *B32B 1/00* | (2006.01) |
| *B32B 27/08* | (2006.01) |
| *B29C 47/06* | (2006.01) |
| *B32B 27/32* | (2006.01) |
| *B32B 21/02* | (2006.01) |
| *B32B 27/04* | (2006.01) |
| *C08L 23/06* | (2006.01) |
| *C08L 23/08* | (2006.01) |
| *B29D 99/00* | (2010.01) |
| *B27N 5/00* | (2006.01) |

(52) U.S. Cl.
CPC ......... *B32B 27/32* (2013.01); *Y10T 428/24802* (2015.01); *Y10T 428/269* (2015.01); *B32B 1/00* (2013.01); *B32B 27/08* (2013.01); *B32B 2419/00* (2013.01); *B29D 99/0003* (2013.01); *B27N 5/00* (2013.01); *B29C 47/06* (2013.01); *B32B 21/02* (2013.01); *B32B 27/04* (2013.01); *C08L 23/06* (2013.01); *C08L 23/0876* (2013.01); *C08L 2207/20* (2013.01)

(58) Field of Classification Search
None
See application file for complete search history.

(56) References Cited

U.S. PATENT DOCUMENTS

| | | |
|---|---|---|
| 3,170,832 A | 2/1965 | Wilson et al. |
| 3,471,355 A | 10/1969 | Truesdell et al. |

(Continued)

FOREIGN PATENT DOCUMENTS

| | | |
|---|---|---|
| CA | 2028527 A1 | 3/1992 |
| CA | 2594258 A1 | 7/2006 |

(Continued)

OTHER PUBLICATIONS

International Search Report and Written Opinion for PCT/US2012/042248, mailed Feb. 19, 2013 (27 pages).

(Continued)

*Primary Examiner* — Monique Jackson
(74) *Attorney, Agent, or Firm* — Goodwin Procter LLP

(57) ABSTRACT

An extruded composite adapted for use as a building material includes a core having a base polymer and a natural fiber in a substantially homogeneous mixture and an ionomer capstock. To improve adherence of the ionomer to a base polymer, the ionomer can be mixed with a similar or substantially similar base polymer prior to coextrusion with the core. Additionally, various additives may be mixed with the capstock material to improve visual aesthetics of the product and performance of the building material, especially over time.

30 Claims, 11 Drawing Sheets

(56) References Cited

U.S. PATENT DOCUMENTS

| | | |
|---|---|---|
| 3,478,134 A | 11/1969 | Gruss et al. |
| 3,511,750 A | 5/1970 | Hider |
| 3,560,324 A | 2/1971 | Quackenbush |
| 3,717,534 A | 2/1973 | Duling et al. |
| 3,801,417 A | 4/1974 | Shanok et al. |
| 3,856,724 A * | 12/1974 | O'Connor et al. ............... 524/35 |
| 3,864,201 A | 2/1975 | Susuki et al. |
| 3,936,554 A | 2/1976 | Squier |
| 3,959,434 A | 5/1976 | Squier |
| 3,970,324 A | 7/1976 | Howat |
| 3,995,980 A | 12/1976 | Smith |
| 4,025,686 A | 5/1977 | Zion |
| 4,028,159 A | 6/1977 | Norris |
| 4,045,603 A | 8/1977 | Smith |
| 4,154,893 A | 5/1979 | Goldman |
| 4,158,646 A | 6/1979 | Benkowski et al. |
| 4,212,703 A | 7/1980 | D'Amico et al. |
| 4,212,928 A | 7/1980 | Arney, Jr. |
| 4,315,048 A | 2/1982 | Beghelli et al. |
| 4,382,108 A | 5/1983 | Carroll et al. |
| 4,388,435 A | 6/1983 | Loch |
| 4,438,166 A | 3/1984 | Gluck et al. |
| 4,463,043 A | 7/1984 | Reeves et al. |
| 4,469,741 A | 9/1984 | Akao |
| 4,480,061 A * | 10/1984 | Coughlin et al. ............... 524/13 |
| 4,503,115 A | 3/1985 | Hemels et al. |
| 4,567,987 A | 2/1986 | Lepisto et al. |
| 4,695,501 A | 9/1987 | Robinson |
| 4,942,084 A | 7/1990 | Prince |
| 5,002,624 A | 3/1991 | Howell et al. |
| 5,134,026 A | 7/1992 | Melcher |
| 5,160,772 A | 11/1992 | Futami et al. |
| 5,217,655 A | 6/1993 | Schmidt et al. |
| 5,275,862 A | 1/1994 | Ramadan et al. |
| 5,294,384 A | 3/1994 | David et al. |
| 5,393,536 A | 2/1995 | Brandt et al. |
| 5,441,801 A | 8/1995 | Deaner et al. |
| 5,486,553 A | 1/1996 | Deaner et al. |
| 5,496,648 A | 3/1996 | Held |
| 5,498,667 A | 3/1996 | David et al. |
| 5,516,472 A | 5/1996 | Laver |
| 5,534,590 A | 7/1996 | Horiie et al. |
| 5,535,945 A | 7/1996 | Sferrazza et al. |
| 5,539,027 A | 7/1996 | Deaner et al. |
| 5,578,370 A | 11/1996 | Ferrar et al. |
| 5,591,802 A | 1/1997 | David et al. |
| 5,601,912 A | 2/1997 | Ellingson |
| 5,626,939 A | 5/1997 | Kotlair et al. |
| 5,641,553 A | 6/1997 | Tingley |
| 5,648,138 A | 7/1997 | Tingley |
| 5,662,994 A | 9/1997 | Funger et al. |
| 5,695,874 A | 12/1997 | Deaner et al. |
| 5,722,603 A | 3/1998 | Costello et al. |
| 5,725,939 A | 3/1998 | Nishibori et al. |
| 5,728,741 A | 3/1998 | Zegler et al. |
| 5,735,092 A | 4/1998 | Clayton et al. |
| 5,738,935 A | 4/1998 | Turk et al. |
| 5,773,138 A | 6/1998 | Seethamraju et al. |
| 5,786,279 A | 7/1998 | Funger et al. |
| 5,786,280 A | 7/1998 | Funger et al. |
| 5,792,529 A | 8/1998 | May |
| 5,804,641 A | 9/1998 | Iwakawa |
| 5,827,462 A | 10/1998 | Brandt et al. |
| 5,827,607 A | 10/1998 | Deaner et al. |
| 5,836,128 A | 11/1998 | Groh et al. |
| 5,840,773 A | 11/1998 | Booij et al. |
| 5,847,016 A | 12/1998 | Cope |
| 5,858,522 A | 1/1999 | Turk et al. |
| 5,866,264 A | 2/1999 | Zehner et al. |
| 5,869,138 A | 2/1999 | Nishibori et al. |
| 5,883,191 A | 3/1999 | Hughes |
| 5,912,315 A | 6/1999 | Horiie et al. |
| 5,919,575 A | 7/1999 | Bowns, IV et al. |
| 5,932,334 A | 8/1999 | Deaner et al. |
| 5,948,524 A | 9/1999 | Seethamraju et al. |
| 5,951,927 A | 9/1999 | Cope |
| 5,981,067 A | 11/1999 | Seethamraju et al. |
| 6,004,668 A | 12/1999 | Deaner et al. |
| 6,007,590 A | 12/1999 | Sanders, Jr. |
| 6,011,091 A | 1/2000 | Zehner |
| 6,015,611 A | 1/2000 | Deaner et al. |
| 6,015,612 A | 1/2000 | Deaner et al. |
| 6,015,856 A | 1/2000 | Matsushita et al. |
| 6,054,207 A | 4/2000 | Finley |
| 6,059,207 A | 5/2000 | Costello et al. |
| 6,063,473 A | 5/2000 | Zafiroglu |
| 6,066,367 A | 5/2000 | Nishibori et al. |
| 6,066,680 A | 5/2000 | Cope |
| 6,083,601 A | 7/2000 | Prince et al. |
| 6,096,403 A | 8/2000 | Wycech |
| 6,103,791 A | 8/2000 | Zehner |
| 6,106,654 A | 8/2000 | Velin et al. |
| 6,132,840 A | 10/2000 | Lee et al. |
| 6,133,349 A | 10/2000 | Hughes |
| 6,180,211 B1 | 1/2001 | Held |
| 6,194,051 B1 | 2/2001 | Gagas et al. |
| 6,210,792 B1 | 4/2001 | Seethamraju et al. |
| 6,211,275 B1 | 4/2001 | Xanthos et al. |
| 6,217,967 B1 | 4/2001 | Bobrowicz |
| 6,241,168 B1 | 6/2001 | Young et al. |
| 6,265,037 B1 | 7/2001 | Godavarti et al. |
| 6,271,270 B1 | 8/2001 | Muzzy et al. |
| 6,274,637 B1 | 8/2001 | Schallenberg et al. |
| 6,305,920 B1 | 10/2001 | Kean et al. |
| 6,306,318 B1 | 10/2001 | Ricciardelli et al. |
| 6,316,016 B1 | 11/2001 | Iwakawa |
| 6,342,172 B1 | 1/2002 | Finley |
| 6,344,268 B1 | 2/2002 | Stucky et al. |
| 6,344,515 B1 | 2/2002 | Parikh et al. |
| 6,352,784 B1 | 3/2002 | Katagiri |
| 6,357,197 B1 | 3/2002 | Serino et al. |
| 6,375,777 B1 | 4/2002 | Sjolin et al. |
| 6,383,652 B1 | 5/2002 | Templeton et al. |
| 6,387,967 B2 | 5/2002 | Muzzy et al. |
| 6,465,046 B1 | 10/2002 | Hansson et al. |
| 6,498,205 B1 | 12/2002 | Zehner |
| 6,511,757 B1 | 1/2003 | Brandt et al. |
| 6,517,935 B1 | 2/2003 | Kornfalt et al. |
| 6,526,712 B2 | 3/2003 | Brooks et al. |
| 6,558,754 B1 | 5/2003 | Velin et al. |
| 6,565,919 B1 | 5/2003 | Hansson et al. |
| 6,579,605 B2 | 6/2003 | Zehner |
| 6,592,962 B2 | 7/2003 | Edwards et al. |
| 6,605,245 B1 | 8/2003 | Dubelsten et al. |
| 6,632,863 B2 | 10/2003 | Hutchison et al. |
| 6,662,515 B2 | 12/2003 | Buhrts et al. |
| 6,673,207 B1 | 1/2004 | Nishibori et al. |
| 6,680,090 B2 | 1/2004 | Godavarti et al. |
| 6,682,789 B2 | 1/2004 | Godavarti et al. |
| 6,682,814 B2 | 1/2004 | Hendrickson et al. |
| 6,685,993 B1 | 2/2004 | Hansson |
| 6,692,815 B2 | 2/2004 | Edgman |
| 6,723,424 B2 | 4/2004 | Ricciardelli et al. |
| 6,749,921 B1 | 6/2004 | Edwards et al. |
| 6,756,412 B2 | 6/2004 | Muzzy |
| 6,758,996 B2 | 7/2004 | Monovoukas et al. |
| 6,761,794 B2 | 7/2004 | Mott et al. |
| 6,786,988 B1 | 9/2004 | Bell |
| 6,814,826 B1 | 11/2004 | Bell |
| 6,821,613 B1 | 11/2004 | Kagi et al. |
| 6,821,614 B1 | 11/2004 | Dubelsten et al. |
| 6,844,049 B2 | 1/2005 | Amin-Javaheri |
| 6,860,953 B1 | 3/2005 | Grizzle et al. |
| 6,863,972 B2 | 3/2005 | Burger et al. |
| 6,865,849 B1 | 3/2005 | Mollinger et al. |
| 6,866,081 B1 | 3/2005 | Nordgard et al. |
| 6,867,322 B1 | 3/2005 | Kato et al. |
| 6,872,674 B2 | 3/2005 | Williams et al. |
| 6,953,501 B2 | 10/2005 | Kelley et al. |
| 6,958,185 B1 | 10/2005 | Zehner |
| 6,971,211 B1 | 12/2005 | Zehner |
| 6,972,144 B2 | 12/2005 | Roth et al. |
| 7,022,751 B2 | 4/2006 | Zhang et al. |
| 7,030,179 B2 | 4/2006 | Patterson et al. |

(56) References Cited

U.S. PATENT DOCUMENTS

| | | |
|---|---|---|
| 7,037,459 B2 | 5/2006 | Easter |
| 7,045,590 B2 | 5/2006 | Bell |
| 7,169,464 B2 | 1/2007 | Semmens |
| 7,175,905 B2 | 2/2007 | Curtis et al. |
| 7,186,457 B1 | 3/2007 | Zehner et al. |
| 7,258,913 B2 | 8/2007 | Jo et al. |
| 7,335,424 B2 | 2/2008 | Domine et al. |
| 7,348,067 B1 | 3/2008 | Hoffman |
| 7,405,008 B2 | 7/2008 | Domine et al. |
| 7,409,796 B2 | 8/2008 | Sacks |
| 7,410,687 B2 | 8/2008 | Dolinar |
| 7,414,084 B2 | 8/2008 | Yamaguchi et al. |
| 7,416,779 B2 | 8/2008 | Hashiba et al. |
| 2001/0051243 A1 | 12/2001 | Godavarti et al. |
| 2001/0051249 A1 | 12/2001 | Gagas et al. |
| 2002/0007899 A1 | 1/2002 | Mott et al. |
| 2002/0009936 A1 | 1/2002 | North et al. |
| 2002/0014297 A1 | 2/2002 | Mott et al. |
| 2002/0031653 A1 | 3/2002 | Ricciardelli et al. |
| 2002/0031659 A1 | 3/2002 | Gansen et al. |
| 2002/0038924 A1 | 4/2002 | Nilsson et al. |
| 2002/0092256 A1 | 7/2002 | Hendrickson et al. |
| 2002/0096255 A1 | 7/2002 | Mott |
| 2002/0106498 A1 | 8/2002 | Deaner et al. |
| 2002/0192401 A1 | 12/2002 | Matsumoto et al. |
| 2002/0192431 A1 | 12/2002 | Edgman |
| 2003/0021915 A1 | 1/2003 | Rohatgi et al. |
| 2003/0075824 A1 | 4/2003 | Moore et al. |
| 2003/0087079 A1 | 5/2003 | Okabe et al. |
| 2003/0087572 A1 | 5/2003 | Balthes et al. |
| 2003/0087574 A1 | 5/2003 | Latimer et al. |
| 2003/0104124 A1 | 6/2003 | Pavey et al. |
| 2003/0124940 A1 | 7/2003 | Michael |
| 2003/0138616 A1 | 7/2003 | Englert |
| 2003/0154662 A1 | 8/2003 | Bruchu et al. |
| 2003/0207634 A1 | 11/2003 | Holeschovsky |
| 2003/0229160 A1 | 12/2003 | Williams et al. |
| 2004/0003888 A1 | 1/2004 | Mott et al. |
| 2004/0038002 A1 | 2/2004 | Franco et al. |
| 2004/0058163 A1 | 3/2004 | Gansen et al. |
| 2004/0062920 A1 | 4/2004 | Guilbert et al. |
| 2004/0076820 A1 | 4/2004 | Hodgson |
| 2004/0076846 A1 | 4/2004 | Domine et al. |
| 2004/0096628 A1 | 5/2004 | Saathoff et al. |
| 2004/0101674 A1 | 5/2004 | Ross |
| 2004/0126568 A1 | 7/2004 | Deaner et al. |
| 2004/0142160 A1 | 7/2004 | Cannon et al. |
| 2004/0161623 A1 | 8/2004 | Domine et al. |
| 2004/0161993 A1 | 8/2004 | Tripp et al. |
| 2004/0191617 A1 | 9/2004 | Visco et al. |
| 2004/0192794 A1 | 9/2004 | Patterson et al. |
| 2004/0224589 A1 | 11/2004 | Bacon et al. |
| 2004/0241392 A1 | 12/2004 | Sorrentino |
| 2004/0247845 A1 | 12/2004 | Abe et al. |
| 2004/0259973 A1 | 12/2004 | Sakuma et al. |
| 2005/0008814 A1 | 1/2005 | Bell |
| 2005/0019539 A1 | 1/2005 | Pike |
| 2005/0037176 A1 | 2/2005 | Domine |
| 2005/0042413 A1 | 2/2005 | Bell |
| 2005/0049329 A1 | 3/2005 | Faulkner |
| 2005/0058822 A1* | 3/2005 | Ittel ............................ 428/304.4 |
| 2005/0132643 A1 | 6/2005 | Flanery et al. |
| 2005/0136272 A1 | 6/2005 | VanRheenen |
| 2005/0164580 A1 | 7/2005 | Holeschovsky |
| 2005/0170141 A1 | 8/2005 | Bacon et al. |
| 2005/0170157 A1 | 8/2005 | Armela et al. |
| 2005/0187315 A1 | 8/2005 | Dean |
| 2005/0206029 A1 | 9/2005 | Moore et al. |
| 2005/0233126 A1 | 10/2005 | Pike |
| 2005/0287347 A1 | 12/2005 | Sorrentino |
| 2006/0006564 A1 | 1/2006 | Maldas et al. |
| 2006/0032175 A1 | 2/2006 | Chen et al. |
| 2006/0099393 A1 | 5/2006 | Woodman et al. |
| 2006/0147669 A1 | 7/2006 | Mano et al. |
| 2006/0147687 A1 | 7/2006 | Ricciardelli et al. |
| 2006/0147693 A1 | 7/2006 | Przybylinski et al. |
| 2006/0165972 A1 | 7/2006 | Chimelak et al. |
| 2006/0183821 A1 | 8/2006 | Kaspers et al. |
| 2006/0188734 A1 | 8/2006 | Valentage et al. |
| 2006/0191655 A1 | 8/2006 | Nunn et al. |
| 2006/0229381 A1 | 10/2006 | Bartko |
| 2006/0257597 A1 | 11/2006 | Gleich |
| 2006/0267238 A1 | 11/2006 | Wang |
| 2007/0007682 A1 | 1/2007 | Maldas et al. |
| 2007/0009729 A1 | 1/2007 | Kessing |
| 2007/0009743 A1 | 1/2007 | Kessing et al. |
| 2007/0043128 A1 | 2/2007 | Jenkines et al. |
| 2007/0092701 A1 | 4/2007 | Jeng |
| 2007/0098972 A1 | 5/2007 | Balthes |
| 2007/0104930 A1 | 5/2007 | Grohman |
| 2007/0113759 A1 | 5/2007 | Roth et al. |
| 2007/0128428 A1 | 6/2007 | Moriya et al. |
| 2007/0141316 A1 | 6/2007 | McGrath et al. |
| 2007/0154669 A1 | 7/2007 | Schneider et al. |
| 2007/0154689 A1 | 7/2007 | Hughes et al. |
| 2007/0173551 A1 | 7/2007 | Mancosh et al. |
| 2007/0212531 A1 | 9/2007 | McIntyre et al. |
| 2007/0235705 A1 | 10/2007 | Burger et al. |
| 2008/0010924 A1 | 1/2008 | Pietruczynik et al. |
| 2008/0064794 A1 | 3/2008 | Murdock et al. |
| 2008/0075915 A1 | 3/2008 | Wening et al. |
| 2008/0093763 A1 | 4/2008 | Mancosh et al. |
| 2008/0098935 A1 | 5/2008 | Roth et al. |
| 2008/0102263 A1 | 5/2008 | Slywchuk et al. |
| 2008/0128933 A1 | 6/2008 | Przybylinski et al. |
| 2008/0213562 A1 | 9/2008 | Przybylinski et al. |
| 2008/0263994 A1 | 10/2008 | Kain |
| 2008/0289295 A1 | 11/2008 | Waters et al. |
| 2009/0130355 A1* | 5/2009 | Chen et al. ................. 428/36.6 |
| 2009/0202803 A1 | 8/2009 | Poloso et al. |
| 2010/0021753 A1 | 1/2010 | Hojabr et al. |
| 2010/0159213 A1 | 6/2010 | Przybylinski et al. |

FOREIGN PATENT DOCUMENTS

| | | |
|---|---|---|
| CA | 2538539 A1 | 9/2006 |
| CA | 2607928 A1 | 4/2008 |
| CN | 1821295 A | 8/2006 |
| DE | 24 44 420 | 3/1976 |
| DE | 43 38 199 | 2/1995 |
| EP | 114409 A1 | 8/1984 |
| EP | 0 0688 644 | 12/1995 |
| EP | 950510 A1 | 10/1999 |
| EP | 1016558 A2 | 7/2000 |
| JP | 51 062883 A | 5/1976 |
| JP | 1-105096 | 4/1989 |
| JP | 6155432 A | 6/1994 |
| JP | 2000263624 A | 9/2000 |
| JP | 2001072817 A | 3/2001 |
| JP | 2002241514 A | 8/2002 |
| JP | 2003003018 A | 1/2003 |
| JP | 2005 312782 | 11/2005 |
| KR | 20070111293 A | 11/2007 |
| SE | 504501 C2 | 2/1997 |
| WO | WO-96/12857 | 5/1996 |
| WO | WO-99/07786 A1 | 2/1999 |
| WO | WO-9935364 A1 | 7/1999 |
| WO | WO-00/24577 A1 | 5/2000 |
| WO | WO-0073037 A1 | 12/2000 |
| WO | WO-01/47717 | 7/2001 |
| WO | WO-01/47718 | 7/2001 |
| WO | WO-01/48333 | 7/2001 |
| WO | WO-01/58663 | 8/2001 |
| WO | WO-0158663 A1 | 8/2001 |
| WO | WO-01/78981 A1 | 10/2001 |
| WO | WO-02/04206 | 1/2002 |
| WO | WO-02/04207 | 1/2002 |
| WO | WO-02/04208 | 1/2002 |
| WO | WO-02/47906 | 6/2002 |
| WO | WO-02057692 A2 | 7/2002 |
| WO | WO-02/072367 | 9/2002 |
| WO | WO-02/090129 | 11/2002 |
| WO | WO-03/002338 | 1/2003 |
| WO | WO-03/047858 | 6/2003 |

(56) References Cited

FOREIGN PATENT DOCUMENTS

| | | |
|---|---|---|
| WO | WO-03/061967 | 7/2003 |
| WO | WO-03/064520 A2 | 8/2003 |
| WO | WO-03/080337 | 10/2003 |
| WO | WO-03095537 A1 | 11/2003 |
| WO | WO-2004041534 A1 | 5/2004 |
| WO | WO-2004083541 A2 | 9/2004 |
| WO | WO-2005007384 A1 | 1/2005 |
| WO | WO-2005039843 A1 | 5/2005 |
| WO | WO-2005063479 A1 | 7/2005 |
| WO | WO-2005080496 A1 | 9/2005 |
| WO | WO-2005123380 A1 | 12/2005 |
| WO | WO-2006/074276 A2 | 7/2006 |
| WO | WO-2007056629 A2 | 5/2007 |
| WO | WO-2007/084822 | 7/2007 |
| WO | WO-2008/066751 A1 | 6/2008 |
| WO | WO-2009153324 A1 | 12/2009 |

OTHER PUBLICATIONS

Anonymous: "Separation Process," Research Disclosure, Mason Publications, Hampshire, GB, vol. 388, No. 13, Aug. 1, 1996, ISSN: 0374-4353, 1 page.

European Office Action for 07862186.9 dated May 4, 2010 (7 pages).

International Search Report and Written Opinion for PCT/US2007/024313, mailed on Apr. 15, 2008, 13 pgs.

International Search Report and Written Opinion for PCT/US2007/60381 dated Oct. 1, 2007, 8 pages.

International Search Report and Written Opinion for PCT/US2009/068964 mailed Aug. 10, 2010 (14 pages).

International Search Report and Written Opinion for PCT/US2009/32552, mailed Sep. 15, 2009 (22 pages).

Partial International Search Report for PCT/US09/032552 dated Jun. 6, 2009, 2 pages.

San Diego Plastics, "Celuka Procedure," website: www.sdplastics.com/celudaprocess.html, undated, accessed Dec. 11, 2008, 1 page.

WiseGeek, What are Foam Extrusions?, website: www.wisegeek.com/what-are-foam-extrusions.htm, 2003-2008, accessed Dec. 11, 2008, 2 pages.

Nicole M. Stark and Laurent M. Matuana, Coating WPCS using Co-Extrusion to improve Durability, Coating Wood & Wood Composites: Designing for Durability, Federation of Societies for Coatings Technology, Jul. 23-25, 2007.

Maged Botros, Ph.D., Development of New Generation Coupling Agents for Wood-Plastic Composites, Equistar, Intertech Conference Dec. 3-5, 2003.

Jan H. Schut, Wood is Good for Compounding, Sheet & Profile, Plastics Technology, www.ptonline.com, Mar. 1999.

Jan H. Schut, Foaming Expands Possibilities for Wood-Fiber Composites, Plastics Technology, www.ptonline.com, Jul. 2001.

Scott Gibson, Wood Substitutes Cost More but Promis Less Maintenance, Professional Deck Builder Online/Hanldy Wood, www.deckmagazine.com, Nov. 2007.

Douglas J. Gardener, Adhesion Between Wood & Fiber Reinfored Polymers: Bonding Issues, Power Point Presentation, Advance Engineereed Wood Composites Center.

Jennifer Markarian, Wood Plastic Composites Need Protection, Too, Plastics Engineering, www.4spe.org., Jul. 2007.

Tieq Li and Ning Yan, Ionomer as a multi-functional ingredient for value-added wood-plastic composites, Faculty of Forestry, University of Toronto.

Tieqi Li and Ning Yan, Mechanical properties of wood flour/HDPE/Ionomer composites, Faculty of Forestry, University of Toronto, Toronto Ontario Canada, Composites Part A: Applied Science and Manufacturing, vol. 38, Issue 1, Jan. 2007, pp. 1-12.

K. Oksman, Improved interaction between wood and synthetic polymers in wood/polymer composites, Department of Wood Technology, Lulea University, Skelleftea, Sweden, Wood Science an Technology, vol. 30, Issue 3, Jun. 1996, pp. 197-205.

* cited by examiner

WOOD-PLASTIC COMPOSITES UTILIZING IONOMER CAPSTOCKS AND METHODS OF MANUFACTURE

CROSS-REFERENCE TO RELATED APPLICATION

This application claims priority to and the benefit of U.S. Provisional Application Ser. No. 61/139,205, filed Dec. 19, 2008, the disclosure of which is hereby incorporated by reference herein in its entirety.

FIELD OF THE INVENTION

This invention relates to systems and methods for fabricating extruded wood-plastic composites and, more particularly, to systems for fabricating extruded wood-plastic composites that utilize ionomer capstocks.

BACKGROUND OF THE INVENTION

In the past 25 years, a new type of material has entered the plastics products market. Commonly referred to as wood-plastic composites (WPCs), fiber-plastic composites, or plastic composites (PCs), the new materials have been accepted into the building products markets in applications such as outdoor decking and railing, siding, roofing and a variety of other products. The market for the wood-plastic composite has grown and WPCs now are used in automotive applications, as well as in the building products sector of the economy.

A wood-plastic composite is a blended product of wood, or other natural fibers, and a thermoplastic material. The products can be produced with traditional plastics processes such as extrusion or injection molding. For example, many building products are produced using extrusion processing similar to conventional plastics processing. The wood and plastics materials are blended before or during the extrusion process. The wood-plastic composites often compete with wood in the building products market. The current WPC materials are most often compounds of wood, or natural fibers, and polyethylene, polypropylene, or polyvinyl chloride (PVC). Presently available WPCs, however, suffer from certain drawbacks. For example, if the composite contains too high or too low of a ratio of plastic to wood, the finished product may not have the desired visual appearance or structural performance characteristics. Such products are less desirable in the marketplace. Additionally, WPCs may be expensive to produce, due to the high cost of the thermoplastic materials and other additives used in manufacture.

Ironically, many consumers expect WPCs to appear similar to wood, but also expect WPCs to perform as a robust plastic compound. To increase performance, manufacturers often incorporate UV stabilizers, antioxidants, biocides, color, fire retardants, or other additives into the WPC formulation. These additives, however, can increase manufacturing costs of the product, even though certain additives provide noticeable benefit only on a limited location on the product (e.g., in the case of UV stabilizers, the benefit only effects the exterior of the product that is exposed to sunlight). To reduce the amount of additives that are incorporated into the product, capstocking is often used. In general, capstocks are coextruded with the core material to form a thin layer of polymer over the core extruded material. Various additives may be incorporated into the capstock, thus reducing the total amount of additives per linear foot of product. These capstocks, however, may suffer from delamination from the underlying WPC and may crack or otherwise fail, causing an unsightly appearance, impaired performance, and consumer dissatisfaction.

With certain capstocks, to improve adhesion, a discrete tie layer is typically placed between the core material and capstock, but this tie layer can present a number of problems. For example, the bond formed by the tie layer may separate from one or both of the capstock and core material over time, leading to product failure. This may occur because the capstock and core material may expand and contract at different rates, due to differences in material properties, which may cause failure of the bond. Also, water, ice, or other hazards related to installed environmental conditions can still penetrate the capstock layer, for example, via gaps at the edges of discrete capstock sections. Additionally, manufacturing costs of capstocked products utilizing a discrete tie layer tend to be high, since the tie layer must be applied to finished capstock and core materials.

SUMMARY OF THE INVENTION

In one aspect, the invention relates to an extruded composite adapted for use as a building material, the extruded composite including a core having a base polymer and a natural fiber in a substantially homogeneous mixture and a capstock having an ionomer. In an embodiment, the base polymer is selected from the group consisting of polypropylene, polyethylene, HDPE, MDPE, LDPE, LLDPE, and combinations thereof. In another embodiment, the natural fiber is selected from the group consisting of wood chips, wood flour, wood flakes, sawdust, flax, jute, hemp, kenaf, rice hulls, abaca, and combinations thereof. In yet another embodiment, the capstock further includes a capstock polymer, wherein the ionomer and the capstock polymer are a substantially homogeneous mixture. In still another embodiment, the base polymer a first polymer and the capstock polymer is the first polymer, which may be HDPE.

In another embodiment of the above aspect, the capstock further includes an additive. In an embodiment, wherein the additive includes at least one of a colorant, a UV stabilizer, an antioxidant, a biocide, and a fire retardant. In another embodiment, the colorant is a variegated colorant. In yet another embodiment, the core includes about 1% to about 100% base polymer, by weight. In still another embodiment, the core includes about 46% base polymer, by weight.

In another embodiment of the above aspect, the capstock includes about 1% to about 100% ionomer, by weight; about 20% to about 80% ionomer, by weight; or about 27.5% ionomer, by weight. In another embodiment, the capstock includes about 0% to about 99% capstock polymer, by weight; about 20% to about 80% capstock polymer, by weight; or about 72.5% capstock polymer, by weight. In yet another embodiment, the capstock has a thickness of about 0.012 inches to about 0.040 inches, or about 0.015 inches to about 0.020 inches. In still another embodiment the capstock is bonded directly to at least one side of the core via coextrusion.

In another aspect, the invention relates to a method of manufacturing an extruded composite adapted for use as a building material, the method including the steps of providing a base polymer, providing a natural fiber, mixing and heating the base polymer and the natural fiber to produce a base mixture including a substantially homogeneous melt blend, providing an ionomer, and coextruding the ionomer onto at least a portion of the base mixture through a die to form an extruded profile. In an embodiment, the method further includes the steps of providing a capstock polymer, and mixing and heating the ionomer and the capstock polymer to produce a capstock mixture having a substantially homogeneous melt blend. In another embodiment, the base polymer is a first polymer and the capstock polymer is the first polymer, which may be selected from the group consisting of polypropylene, polyethylene, HDPE, MDPE, LDPE, LLDPE, and combinations thereof. In one embodiment, the first polymer is HDPE. In yet another embodiment, the method further includes the steps of providing an additive, and mixing and heating the ionomer, the capstock polymer, and the additive to produce a capstock mixture having a substantially homogeneous melt blend. In still another embodiment, the additive is at least one of a colorant, a UV stabilizer, an antioxidant, a biocide, and a fire retardant. In another embodiment, the method further includes the step of cooling the extruded profile, which may include passing the extruded profile through a liquid, which maybe at least one of a water and a coolant.

Herein, unless otherwise noted, the use of one material when describing a particular application, process, or embodiment does not limit the described application, process, or embodiment to the specific material identified. The materials may be used interchangeably, in accordance with the described teachings herein. Additionally, unless otherwise noted, the terms WPCs, PCs, fiber-plastic composites, and variations thereof are used interchangeably.

BRIEF DESCRIPTION OF THE DRAWINGS

Other features and advantages of the present invention, as well as the invention itself, will be more fully understood from the following description of the various embodiments, when read together with the accompanying drawings, in which.

DETAILED DESCRIPTION OF THE INVENTION

Figure 1:
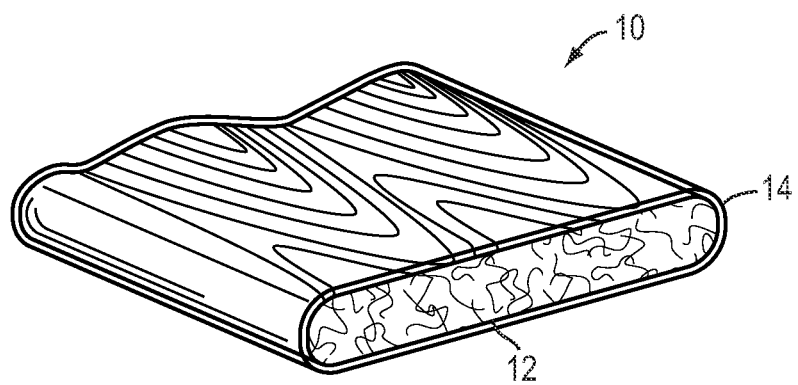
FIG. 1 is a perspective view of a capstocked fiber-plastic composite extrusion fabricated in accordance with one embodiment of the present invention.

FIG. 1 shows one embodiment of a capstocked extruded fiber-plastic composite 10 in accordance with the present invention. The extruded wood-plastic composite (WPC) 10 generally includes a dimensional composite body or core 12 formed from a mixture including one or more base polymers and natural fibers. The base polymers may include polypropylene, polyethylene, HDPE, MDPE, polypropylene, LDPE, LLDPE, PVC, like materials, and combinations thereof. The natural fibers or filler material help to provide the extruded core 12 with the appearance and feel of a natural wood product. Types of natural fibers, such as wood fillers or the like, include wood chips, wood flour, wood flakes, sawdust, flax, jute, abaca, hemp, kenaf, rice hulls, like materials, and combinations thereof. The use of such fillers can reduce the weight and cost of the core 12. Additionally, the core 12 may include additives such as colorants, lubricants, flame retardants, mold inhibitors, compatiblizers, coupling agents, biocides, UV stabilizers, antioxidants, other materials, and combinations thereof.

The core 12 is coated at least on one side by a capstock 14 including, in one embodiment, a mixture of an ionomer and a capstock polymer. In one embodiment, a capstock of HDPE and ionomer over a core having an HDPE base polymer has shown satisfactory results. One purpose of the base polymer is to facilitate the adhesion between the ionomer and the extruded WPC 10 containing the same polymer. Since polymers such as polyethylene weather rapidly under certain conditions, inclusion of ionomer also may improve exterior weather performance. Typically, ionomer alone displays limited adhesion to the underlying composite core 12. The ionomer is the protective component that allows improved surface properties over those of uncoated extruded WPC. The ionomeric compound on the surface of the extruded WPC 10 increases scratch resistance, color fade resistance, and stain resistance, as shown in a number of controlled tests. The ionomer/polymer capstock also reduces damage to the WPC 10 from water at extremely high and low temperatures. Accordingly, it is often desirable to provide capstock on all sides of a WPC. WPCs need not be completely surrounded by capstock to benefit from the advantages associated therewith, however. In some embodiments, it may be desirable to coextrude a capstock onto fewer than all surfaces of a core profile, for example, on only those surfaces subject to the most severe environmental exposure (e.g., an upper horizontal surface and optionally vertical edges of extruded deckboards).

As noted above, in certain embodiments, the capstock polymer is substantially the same as or identical to the base polymer utilized in the core 12. For example, both the capstock polymer and base polymer may be polyethylene. Alternatively, a polyethylene capstock polymer may be used in conjunction with a polypropylene base polymer. Use of polypropylene capstock polymers in conjunction with polyethylene base polymers, as well as other combinations of dissimilar polymers, is also contemplated. This helps ensure adhesion between the core 12 and the capstock 14. Additionally, the capstock 14 may include natural fibers and additives, such as those listed above with regard to the core 12. By incorporating the additives into the capstock 14 instead of the core 12, the total amount of additives per linear foot of extruded composite is significantly reduced, compared to composites that have natural fibers and additives directly incorporated therein.

Figure 2:
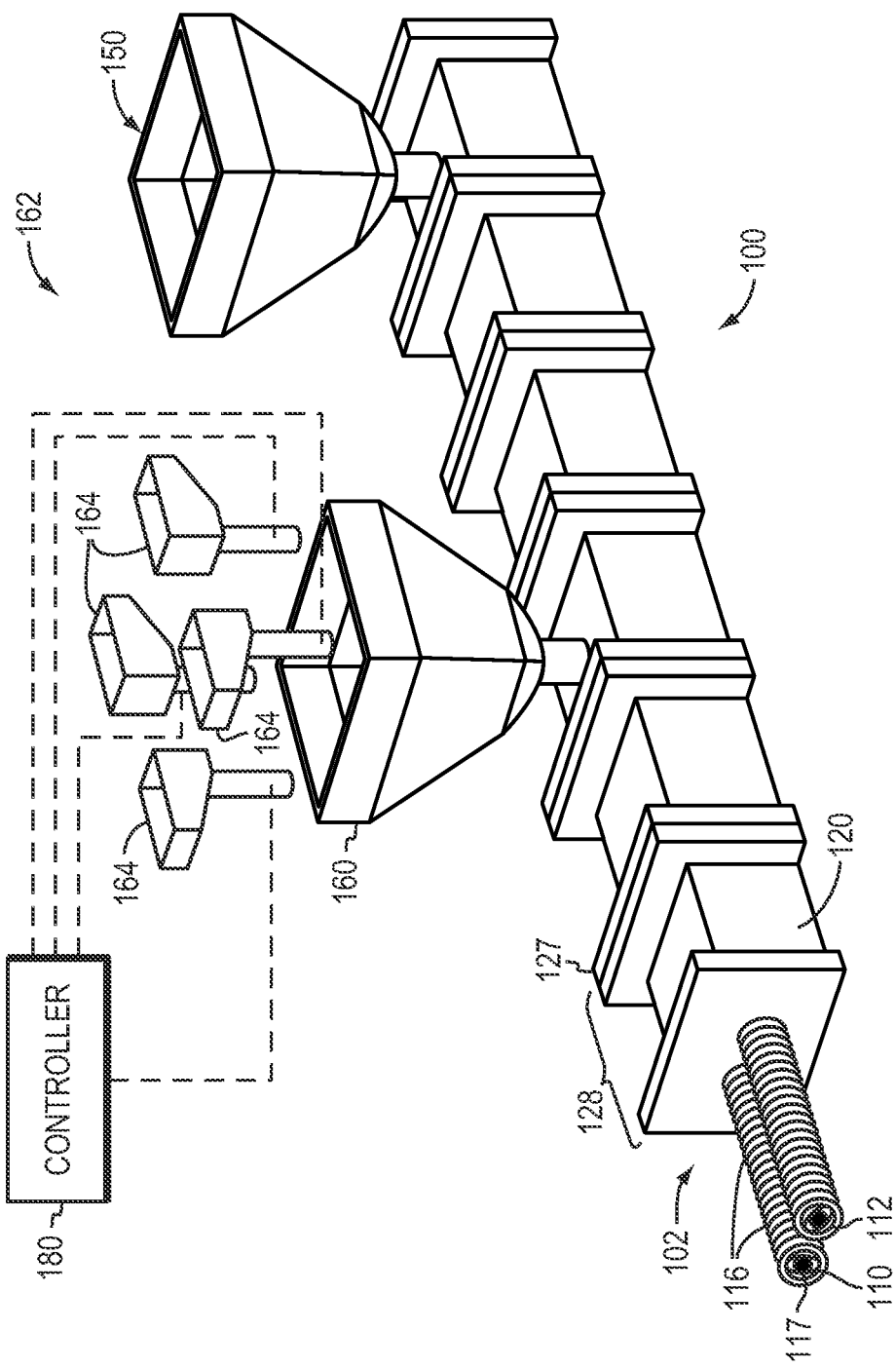
FIG. 2 is a perspective view of a system for forming a capstocked fiber-plastic composite extrusion in accordance with one embodiment of the present invention.
Figure 3:
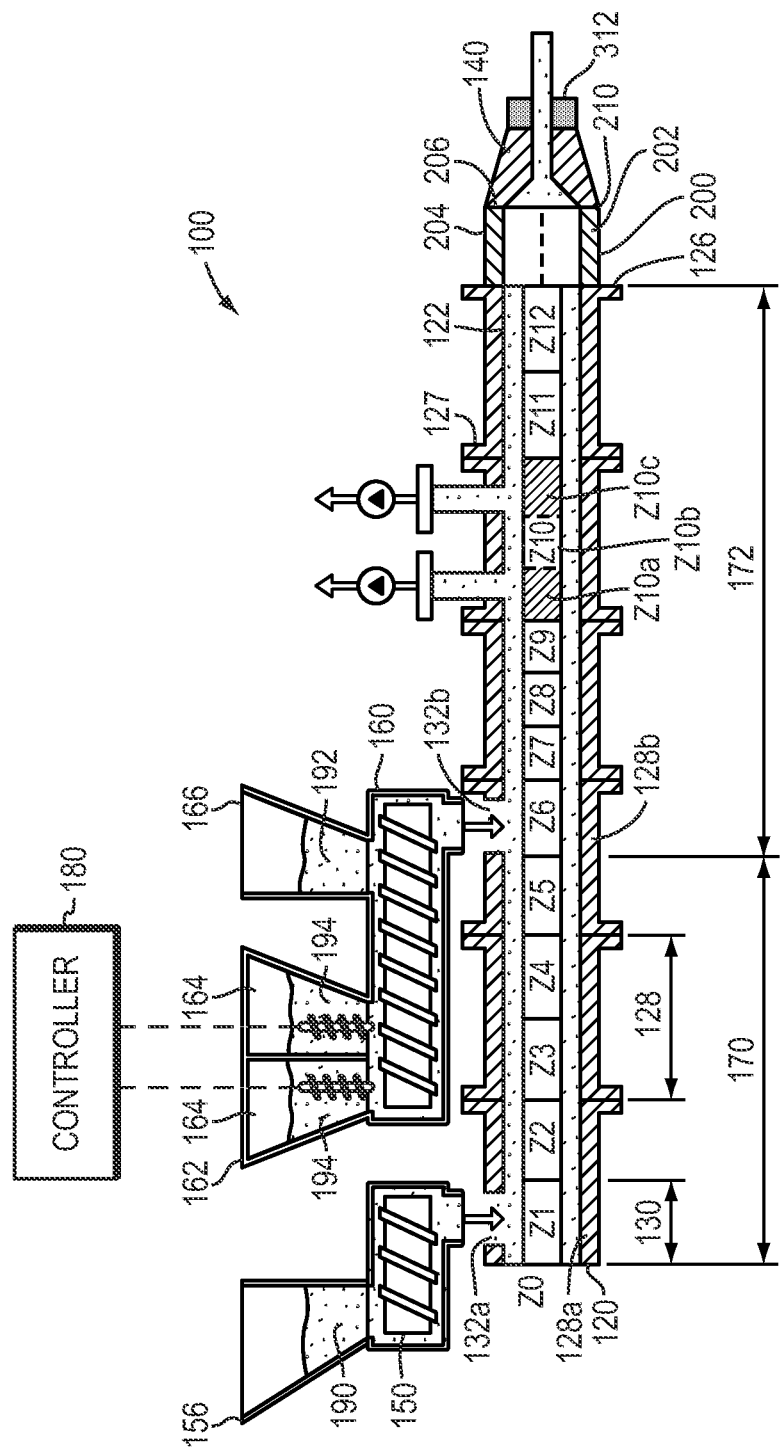
FIG. 3 is a cross-sectional schematic representation of a system for forming a capstocked fiber-plastic composite extrusion in accordance with another embodiment of the present invention.
Figure 4A:
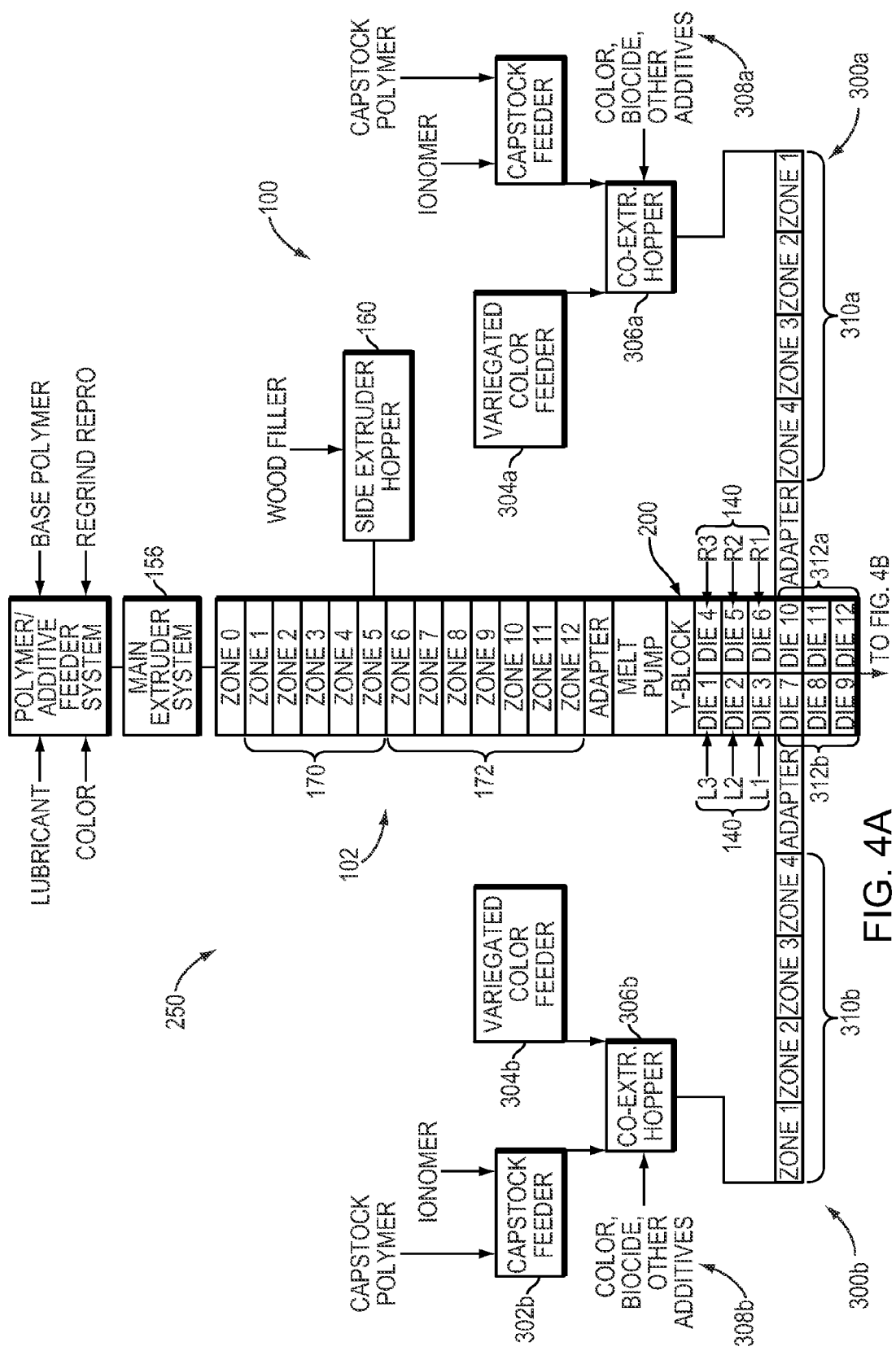
FIGS. 4A and 4B are a schematic representation of a process line for forming a capstocked fiber-plastic composite extrusion in accordance with another embodiment of the present invention.
Figure 4B:
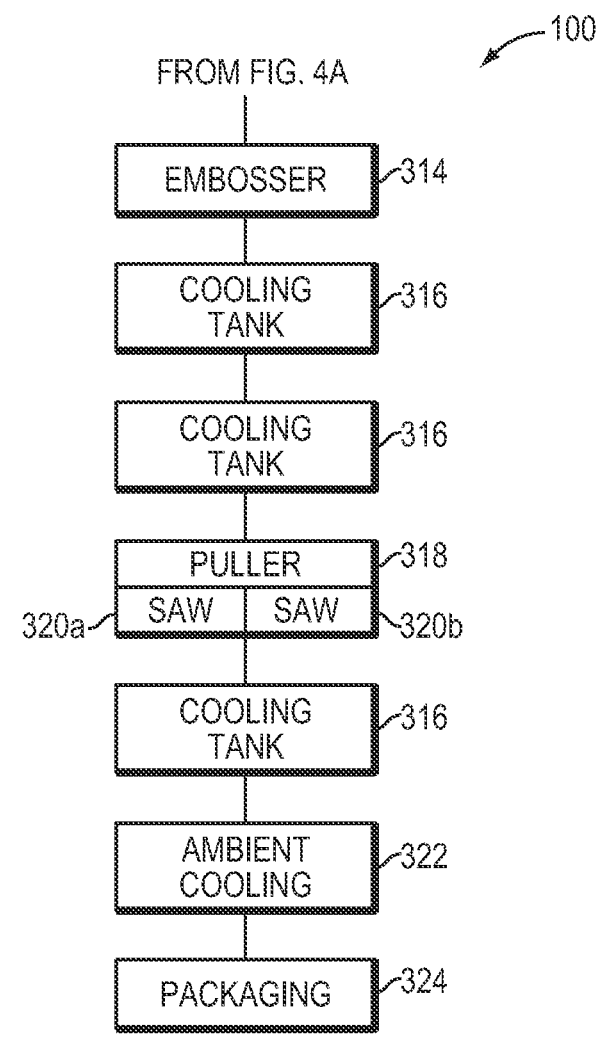

In certain embodiments, the invention includes systems and methods for forming plastic composite extrusions having a coextruded ionomer/polymer capstock. As shown in FIGS. 2 and 3, an extrusion system 100 includes at least four main stations: a supply station or primary feeder 150 that dispenses a base polymer (e.g., in the form of powders and/or pellets) and other additives; a co-rotating twin screw extruder 102 arranged to receive the base polymer; a secondary side-feeder 160 that dispenses additional materials (e.g., filler materials such as wood or natural fibers, additives such as colorants, etc.) into the extruder 102 for mixing with the base polymer; and an extrusion die 140 for forming a composite extrusion with a predetermined profile. FIGS. 4A and 4B, described in more detail below, depict the extrusion system 100 of FIGS. 2 and 3, with two co-extrusion stations and related downstream components for manufacturing finished capstocked WPCs.

In the extrusion system 100 depicted in FIG. 2, the extruder 102 includes an extrusion barrel 120 and a pair of co-rotating extrusion screws 110, 112. The extrusion barrel 120 defines an internal cavity 122 (FIG. 5) where materials (e.g., base polymer, filler materials, additives, etc.) are mixed, heated, and conveyed. The extrusion barrel 120 is formed as an assembly including a plurality of discrete barrel segments 128. The barrel segments 128 are arranged in series and together form the internal cavity 122, which acts as a flow path between the supply station 150 and the extrusion die 140 (i.e., for conveyance of the various materials). The extrusion screws 110, 112 each comprise a plurality of discrete screw segments 116 sealed within the internal cavity 122 and extending from an upstream feed zone 130 to the extrusion die 140. The screw segments 116 are removable, replaceable, and interchangeable and the screw flights can be arranged to achieve a desired feeding, conveying, kneading, and mixing sequence as the materials are processed through the extruder, along the internal cavity 122 of the extrusion barrel 120.

The extrusion screws 110, 112 are arranged in parallel relation and configured for co-rotational movement relative to each other. The co-rotational movement of the extrusion screws 110, 112 mixes materials, such as the base polymer, wood fiber, additives, etc., and conveys these materials through the extrusion barrel 120. The extrusion barrel 120 and extrusion screws 110, 112 can be made of commercially available parts. A similar type of twin-screw extruder, wherein the screws rotate in a counter-rotational movement relative to each other, may also be used for the process. In a counter-rotational arrangement, the process differs from the above co-rotational configuration in that the mixing and dispersion tend to be less intense. Thus, a greater reliance is placed on the addition of heat, as opposed to shear mixing, to achieve the compounding of all the ingredients prior to passage through the extrusion die 140.

As shown in FIGS. 2 and 3, the extrusion system 100 includes at least four main stations: a supply station 150; a co-rotating twin screw extruder 102; a secondary side-feeder 160; and an extrusion die 140. The supply station 150 can include a single and/or double screw (i.e., twin-screw) loss-in-weight gravimetric feeder for throughput of solid materials, typically in the form of fibers, powders, and/or pellets, into a feed zone 130 in the extruder 102. A loss-in-weight feeder or feeders with a maximum feed rate of between about 50 lb/hr and about 2000 lb/hr may be utilized for typical commercial-sized system. The feeder(s) also deliver materials directly into the extruder when the process is initially started.

Referring still to FIGS. 2 and 3, the twin screw extruder 102 includes an extrusion barrel 120 and a pair of co-rotation extrusion screws 110, 112. The extrusion barrel 120 is an assembly of discrete barrel segments 128 forming a substantially continuous barrel. This arrangement offers flexibility when compared to a counter-rotational extruder, in that the individual barrel segments 128 can be moved, removed, and/or exchanged to provide different barrel configurations, e.g., to allow for different feeding (e.g., entry ports), vacuum, or injection locations. In addition, the segmented barrel configuration offers the flexibility of choosing between multiple entry ports (for example, as shown at 132a, 132b) into the extruder 102. For example, the use of more than one entry port can be employed to achieve a more sophisticated extruded product in terms of compound ingredients, product properties, and appearance. Each barrel segment 128 defines a barrel bore which, when assembled, forms a substantially continuous internal cavity 122 along the length of the extrusion barrel 120 (i.e., extending from the feed zone 130 toward the extrusion die 140). Each barrel segment 128 includes electrical heating elements, such as heating cartridges, and cooling bores for counter-flow liquid cooling, together providing for optimizeable dynamic regulation and control of temperature.

Individual barrel segments 128 are selected from open barrels (i.e., with entry ports for feed zones), open barrels with inserts (for degassing, metering, or injection zones), closed barrels, and/or combined barrels for combined feeding (e.g., side feeding of fibers or additives) and venting, each being between about four inches and about twenty inches in length. As shown in FIG. 3, the extrusion barrel 120 includes two open barrel segments 128a, 128b for fluid communication with the primary feeder 150 and the secondary sidefeeder(s) 160, respectively. A leak-proof seal is formed at the interface between adjacent barrel segments 128. Adjacent barrel segments 128 can be connected with bolted flanges 127, as shown in FIG. 2, or, alternatively, C-clamp barrel connectors.

Referring to FIG. 2, the co-rotating extrusion screws 110, 112 provide for a relatively efficient type of extruder in terms of its ability to disperse and distribute additions and other materials within a matrix of the molten extrudate. As shown, each of the extrusion screws 110, 112 comprises a segmented screw arrangement, wherein each of the extrusion screws 110, 112 include a series of discrete elements or flights (i.e., screw segments 116) fit onto a shaft 117. Teeth or splines 124 (see FIG. 5) allow the individual segments 116 to be secured to the shaft 117. Suitable screw segments are commercially available from ENTEK Manufacturing, Inc., of Lebanon, Oreg. The individual screw segments 116 are each removable and replaceable and may be selected to have contrasting screw profiles, thus allowing for a flexible screw profile arrangement that can be tailored to specific applications and/or process requirements.

Among the various types of screw segment profiles, the individual segments can be selected from conveying elements, mixing elements, kneading elements, and/or special elements. Mixing and kneading elements are designed in a variety of lengths, pitches and pitch directions. Kneading blocks are constructed using several sub-segments of equal or varying widths spaced at equal distances from each other. The order in which kneading, mixing, conveying, and other segments may be arranged to control shear, the degree of melt, and energy addition. In addition, this mixing process provides homogeneous melt and controlled dispersion-distribution of the base polymer and other additives. The segmented screws 110, 112 allow for modification of the screw profile, e.g., for modification of processing parameters, varying physical properties, and/or surface appearance of the extruded product. Generally, an overall diameter of the screw segments remains constant; however, the shape of the flights (e.g., pitch and distance between flights) can vary.

The screw segments 116 can be arranged so that about a first half of the extruder 102 provides relatively high shearing and kneading (i.e., for dispersive mixing of the base materials and any additives) and about the second half of the extruder 102 provides relatively low shearing (i.e., for distributive mixing of the composite material and colorants or other additives). This arrangement can be used to inhibit overmixing of the one or more polymers and additives that form the polymeric portion of the composite material.

FIGS. 3, 4A, and 4B depict an exemplary embodiment of the manufacturing equipment. Each of extrusion screws 110, 112 includes fifty-two (52) discrete screw segments 116, each between about 60 mm and about 120 mm in length. This particular configuration defines twelve (12) processing zones Z1-Z12, each zone exhibiting a change in screw profile defined by one or more discrete screw segments (see, e.g., FIGS. 3, 4A, 4B, and Table A-1). In this embodiment, the screw segments 116 are arranged such that the first five zones (Z1-Z5) form a first mixing region 170 configured for dispersive mixing (i.e., relatively high kneading and shearing), and the last seven zones (Z6-Z12) form a second mixing region 172 configured for distributive mixing (i.e., relatively low shearing). In dispersive mixing, cohesive resistances between particles can be overcome to achieve finer levels of dispersion; dispersive mixing is also called intensive mixing. In other words, dispersive mixing includes the mixing and breaking down of discrete particles within the compound. Distributive mixing aims to improve the spatial distribution of the components without cohesive resistance playing a role; it is also called simple or extensive mixing. Distributive mixing allows for division and spreading of discrete particles into a mixture without substantially affecting the size and/or shape of the particles (i.e., no breaking down of the particles).

FIGS. 4A and 4B depict a schematic representation of a process line 250 for forming a capstocked WPC in accordance with one embodiment of the invention. Depicted is the extruder 102, as well as a pair of capstock extruders 300a, 300b, and various components downstream of the profile extrusion system 100 depicted in FIGS. 2 and 3. Each capstock extruder system 300 includes a capstock feeder 302 and a variegated color feeder 304 that each deliver desired quantities of components to a coextrusion hopper 306. The capstock feeder 302 is filled with a mixture of ionomer and base capstock polymer, in any ratio desired or required for a particular application. This mixture may be delivered premixed to the feeder 302 or may be introduced to the feeder 302 via two hoppers. Additional additives may be introduced to the hopper 306 via one or more additive feeders 308. The additives may include colors, biocides, flame retardants, UV inhibitors, etc.

Each coextruder body 310 includes, in the depicted embodiment, four zones (Z1-Z4) and connects to a coextrusion die 312 at the outlet of the core extrusion die 140. The coextruder 310 may be either a single-screw or twin-screw configuration. Process parameters associated with the capstock extruder 300 are presented in Table A-1. In the depicted embodiment, unlike the extruder 102, the extruder body 310, the screw and barrel are not segmented. Additionally, the screw profile is not designed for mixing, but rather for melting and conveying. In other embodiments, different types of extruders using segmented barrels or screws may be utilized. In certain embodiments, output from each coextruder body 310 is about 125 lb/hr to about 175 lb/hr. If a single capstock coextruder is utilized, the output may be between about 250 lb/hr to about 400 lb/hr. Other outputs are contemplated, depending on configurations of particular process lines, surface area and thickness of the capstock layer, etc. In general, the coextruder output represents about 5% of the total output of the system 100. After extrusion, the extruded, capstocked composite may be decorated by an embosser 314, if desired, and passed through one or more cooling tanks 316, which may be filled with a liquid such as water and/or coolant, to expedite cooling. Optional sizing dies of the vacuum type or other types may be used during cooling to maintain dimensional requirements for the composite. A puller 318 is used to pull the extruded composite through the cooling tanks 316 and sizing dies to maintain dimensional consistency of the product as it is cooled. One or more saws 320 cut the finished extruded composite prior to a final ambient cooling station 322 and a packaging station 324.

Other embodiments of the process line 250 depicted in FIGS. 4A and 4B are contemplated. For example, a single coextruder 310 may be utilized to feed molten capstock material to both coextrusion dies 312a, 312b. The depicted co-extruder system may be particularly desirable, however, allowing capstocks of different formulations to be applied to different surfaces of the extruded WPC, or to permit quick changeover of capstock material to be applied to same batch of core material. This allows for production of capstocked WPCs of different colors, for example.

Table A-1 identifies typical zone temperatures and other details regarding the extruder processing system employed in the various embodiments of the invention. Temperatures for each zone, in a high/low range, are presented. Notably, the ranges presented may be utilized to produce both capstocked and uncapstocked WPCs. Additionally, the ranges presented may also be utilized to produce composites that utilize no wood or natural fibers at all, but that are made solely of additives and base polymer. Examples of both capstocked and uncapstocked WPCs manufactured in accordance with the ranges exhibited in Table A-1 are described below. Temperature and other process parameter ranges outside of those depicted are also contemplated.

TABLE A-1

Processing Parameters for Coextruded Capstocked Composites

MAIN EXTRUDER

| | Melt Pump Inlet | | Melt Pump Outlet | | Extruder | Melt | Polymer | Wood | Added |
| | Mat'l Temp deg C. | Pressure Bar | Mat'l Temp deg C. | Pressure Bar | Speed rpm | Pump rpm | Feed lb/hr | Feed lb/hr | Wax lb/hr |
|---|---|---|---|---|---|---|---|---|---|
| High | 180 | 30 | 185 | 80 | 350 | 25 | 2000 | 2000 | 10 |
| Low | 140 | 7 | 140 | 10 | 250 | 15 | 700 | 800 | 0 |

| | Zone 0 Set deg C. | Zone 1 Set deg C. | Zone 2 Set deg C. | Zone 3 Set deg C. | Zone 4 Set deg C. | Zone 5 Set deg C. | Zone 6 Set deg C. | Zone 7 Set deg C. | Zone 8 Set deg C. | Zone 9 Set deg C. | Zone 10 Set deg C. | Zone 11 Set deg C. | Zone 12 Set deg C. |
|---|---|---|---|---|---|---|---|---|---|---|---|---|---|
| High | 60 | 240 | 240 | 240 | 240 | 190 | 180 | 165 | 155 | 150 | 150 | 150 | 150 |
| Low | 30 | 190 | 190 | 190 | 190 | 180 | 170 | 155 | 145 | 130 | 125 | 115 | 110 |

TABLE A-1-continued

Processing Parameters for Coextruded Capstocked Composites

|  | Adapter Set deg C. | Melt Pump Set deg C. | Y-block 1 Set deg C. | Y-block 2 Set deg C. | Y-block 3 Set deg C. | Die L1 Set deg C. | Die L2 Set deg C. | Die L3 Set deg C. | Die R1 Set deg C. | Die R2 Set deg C. | Die R3 Set deg C. |
|---|---|---|---|---|---|---|---|---|---|---|---|
| High | 165 | 165 | 165 | 165 | 165 | 165 | 165 | 165 | 165 | 165 | 165 |
| Low | 140 | 140 | 140 | 140 | 140 | 140 | 140 | 140 | 140 | 140 | 140 |

CO-EXTRUDER

|  | Extruder Speed rpm | Zone 1 Set deg C. | Zone 2 Set deg C. | Zone 3 Set deg C. | Zone 4 Set deg C. | Adapter Set deg C. |
|---|---|---|---|---|---|---|
| High | 130 | 180 | 190 | 190 | 200 | Ambient |
| Low | 130 | 130 | 140 | 150 | 160 | Ambient |

With regard to the main extruder, in general, conveying and feed elements (e.g., Z1, Z2, Z4, Z6, Z8, Z10, and Z12) serve to displace material through the extrusion barrel 120, from the first entry port 132a toward the extrusion die 140. Kneading blocks (see, e.g., Z3 and Z6) provide for high shear and dispersing (e.g., of base materials). Mixing elements (see, e.g., Z7, Z9, and Z11) provide for relatively high particle distribution (e.g., high distribution of fiber materials). Zones having a flight pitch less than 90° provide for compression of materials. Zones having a flight pitch of about 90° provide for frictional heating of the materials while providing little if any aid in the conveyance of the material. Zones having a flight pitch exceeding 90° provide for relatively high conveyance.

Figure 5:
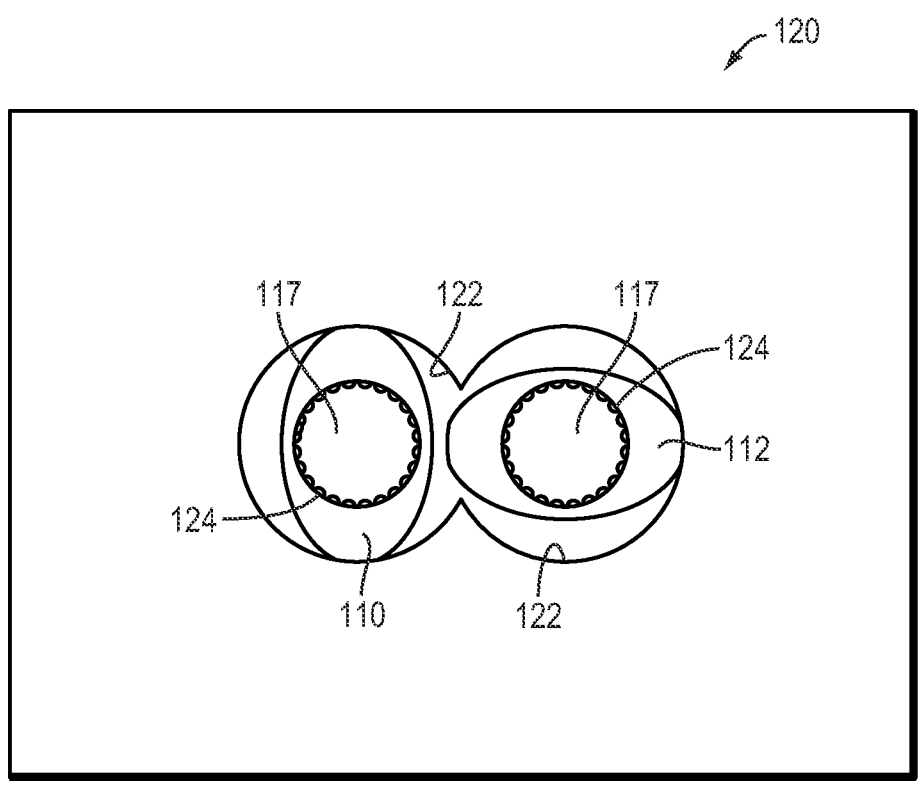
FIG. 5 is an end view of a co-rotating twin screw extruder used in a system for forming a capstocked fiber-plastic composite extrusion in accordance with another embodiment of the present invention.

Referring to FIGS. 3-5, and Table A-1, zone Z0 is the ambient temperature. Zones Z1 and Z2 are configured for moving materials from the throat of the extruder 102 and heating it before it is introduced to zone Z3. More specifically, the first processing zone Z1 is configured to move cold material, e.g., pelletized base polymers, from an entry point at ambient temperature, i.e., main entry port 132a, toward the second processing zone Z2. The second processing zone Z2 is configured to increase pressure on the material as it is moved forward in the direction of the third processing zone Z3. The first eight to twenty-four segments making up the second processing zone Z2 have a flight pitch of about 90°. In this portion, conveyance is achieved primarily through the introduction of additional material from the first processing zone Z1, which results in the build up of pressure in the second processing zone Z2, which, in turn, forces the material through the second processing zone Z2.

Processing zones Z3-Z5 define a high shear section. In this section the base materials are thoroughly dispersed into a molten composite mixture. Zone Z6 marks a transition to the distributive mixing region 172. This is the zone in which the wood or other natural fibers (as fillers) and some additives are added to the molten composite mixture. The greater flight pitch of 120° in this zone provides for increased conveyance along or about zone Z6, i.e., this zone moves materials along quickly, thereby inhibiting cooling-off of the materials. Zones Z7-Z9 are configured to provide high distribution mixing of the fiber filler material with the molten composite mixture. The tenth processing zone Z10 includes six to twelve discrete screw segments. These segments define a first section Z10a of relatively high compression, followed by a section Z10b of relatively low conveyance, which allows the material to expand, allowing moisture to rise to the outer surface where it can evaporate and be vented from the extrusion barrel 120. This is followed by a second section Z10c of relatively high compression.

The eleventh processing zone Z11 is a mixing zone with a relatively high flight pitch, which provides for increased conveyance and subtle mixing. The twelfth processing zone Z12 transitions from a first section of relatively high conveyance (i.e., this zone moves material at a relatively high flow/feed rate to inhibit cooling prior to entering the die) to a second section of relatively high compression, which provides for a build-up of pressure near the distal end 126 of the extruder 102, for forcing the material through the extrusion die 140.

Referring again to FIGS. 2-4B, one or more secondary side-feeders 160 are provided for dispensing one or more additional materials (e.g., filler materials or natural fibers, colorants, and/or other additives) into the extrusion barrel for mixing with the base polymer. As described herein, providing these additives in the capstock material instead of the core material may be desirable and reduce the total amount of additives added per linear foot of extruded composite. It may be desirable or required to include additives within the core material to meet certain requirements (e.g., the addition of additives such as fire retardants to meet particular product safety regulations). The secondary side-feeders 160 move the materials into the extruder 120 through a second side entry port 132b using a single-screw or double-screw configuration. As shown in FIG. 3, the secondary side-feeder 160 can include one or more loss-in-weight gravimetric feeders 166 for dispensing wood fibers and a multiple feeder array 162, such as volumetric auger feeders, for dispensing multiple colorants (or other additives) into the extruder. Thus, two, three, four or more additives may be added from individual hoppers 164 during the extrusion process.

The secondary side-feeder 160 can be disposed in a position downstream of the primary feeder 150 (where the base polymer is introduced) and the first mixing region 170, such that the filler materials and additives are dispensed into the extruder 102 for mixing with the base polymer in the second (relatively low kneading and shear) mixing region 172. Introduction of the filler material and additives at a common zone may present particular advantages. For example, the downstream shearing and kneading effect of the extrusion screws 110, 112 on the fibers and additives is less than the upstream effect on the base materials, thereby providing a thoroughly mixed composite material (i.e., including the base polymer and filler materials).

Figure 6:
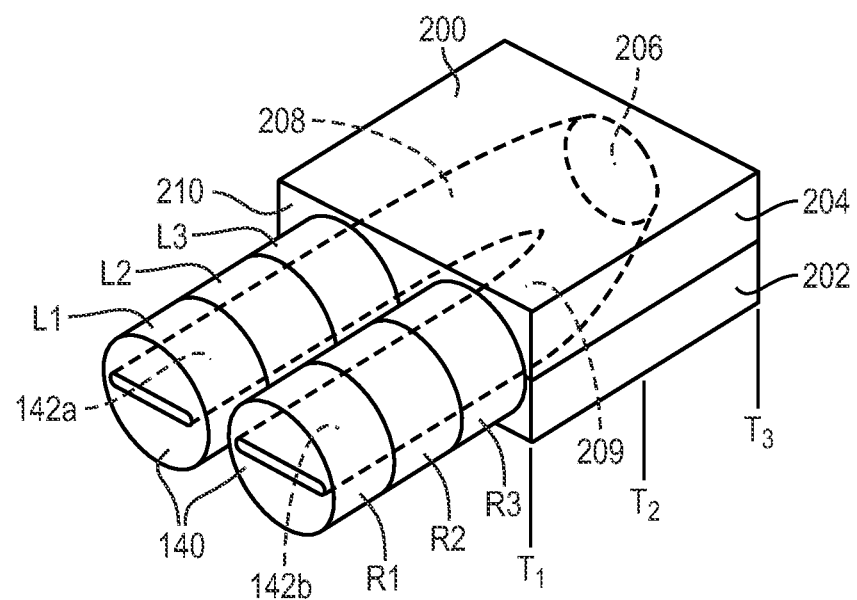
FIG. 6 is a perspective view of a Y-block adapter and extrusion die assembly used in a system for forming a capstocked fiber-plastic composite extrusion in accordance with another embodiment of the present invention.

As shown in FIGS. 4A, 4B, and 6, the system may include a Y-block adapter 200 disposed at a distal end 126 of the extruder 102. The Y-block adapter 200 includes two adapter segments 202, 204 divided into three temperature zones, approximately defined by locations T1, T2, T3. Heating is performed by heating cartridges. The Y-block adapter 200 defines a flow channel 206, that divides flow from the internal cavity 122 of the extrusion barrel 120 into two discrete flow paths 208, 209.

The system 100 also includes an extrusion die 140 disposed at a distal end 210 of the adapter 200, as depicted in FIG. 6. The extrusion die 140 may define a pair of extrusion channels 142a, 142b, each corresponding to an associated one of the flow paths 208, 209, for forming, in tandem, a pair of extruded products (i.e., extrudates) each having a predetermined profile or shape (i.e., corresponding to a shape of the extrusion channels 142a, 142b). Each of the extrusion channels 142a, 142b includes up to three (or more) discrete segments L1-L3, corresponding to channel 142a, and R1-R3, corresponding to channel 142b. These discrete segments L1-L3, R1-R3 smoothly transition the geometry of the cylindrical flow paths 208, 209 along the extrusion channels 142a, 142b to prevent introduction of air bubbles, creation of low flow or high pressure areas, etc. Each of L1-L3 and R1-R3 comprise discrete temperature zones and are heated using individual heaters.

Referring again to FIG. 3, a base mixture 190 includes a base polymer (in one embodiment, a polyethylene mixture including, for example, virgin high density polyethylene (HDPE), recycled HDPE, and/or reprocessed HDPE), and other additives (e.g., base colorant(s), internal processing lubricants, flame retardants, etc.), generally in the form of solid particles, such as powders and/or pellets. In one embodiment, the base mixture 190 is dispensed from the supply station 150 from a main extruder hopper 156 into the feed zone 130 of the extruder 102 at a total feed rate of between about 400 lb/hr to about 2000 lb/hr. Other suitable base polymers include polypropylene, medium density polyethylene, low density polyethylene, linear low density polyethylene, and PVC, when using a counter-rotational twin-screw extruder. In other embodiments, regrind polymer, reprocessed polymers, and recycled polymer (e.g., carpet waste) may be added along with the base polymer, or as a substitute for virgin base polymer. The base mixture 190 is heated by electrical heating elements, and dispersed (i.e., the polymer particles and additive particles are mixed and broken down) as it is conveyed through the extrusion barrel 120 from the feed zone 130 towards the extrusion die 140 with the extrusion screws 110, 112 at a feed rate of between about 400 lb/hr and about 2000 lb/hr.

As mentioned above, the extrusion screws 110, 112 define twelve discrete processing zones Z1-Z12, wherein the first six processing zones Z1-Z6 form a first mixing region 170 (for relatively high kneading and shearing) and the last six zones Z7-Z12 form a second mixing region 172 configured for relatively low shearing and mixing. High and low temperatures used in various embodiments of the invention are exhibited in Table A-1, although higher or lower temperatures than those depicted are contemplated. As shown in Table A-1, the base mixture 190 is heated from a temperature of about 30° C. (ambient, at zone Z0) to about 240° C. as it is conveyed along the first four (i.e., Z1-Z4) of these processing zones, and gradually cooled before exiting the first mixing region 170, thereby forming a thoroughly mixed molten plastic material. At this point in the process, the molten material is a composite of the base polymer, i.e., high density polyethylene, and additives.

Still other materials, such as filler materials (wood or natural fibers) and colorants can be added to achieve the desired physical properties and appearance effects. The wood or natural fibers give the resultant WPC the desired stiffness, rigidity, appearance, or other properties required of a commercially successful product. The colors are for appearance effects.

Referring again to FIGS. 3, 4A, and 4B, a plurality of natural fibers 192, such as, for example, wood fibers, hemp, kenaf, abaca, jute, flax, and ground rice hulls, and one or more additives, are metered into the extruder 102 through the one or more secondary side-feeders 160 for mixing with the molten polymer materials. The natural fibers 192 and optional additives 194 are introduced into the extruder 102 in an area proximate the sixth processing zone Z6. The fibers 192 and additives/colorants 194 are then mixed with the molten base material 190 as it is conveyed through the second (relatively low shearing) mixing region 172. As the molten composite is conveyed along about the tenth processing zone Z10, it is first compressed under vacuum of about 29 in-Hg. Then, the material is allowed to expand, allowing moisture to rise to an outer surface for evaporation. The material is then compressed again under vacuum of about 25 to about 29 in-Hg. This transition region Z10 removes moisture as the material is conveyed toward the extrusion die. The screw segments 116 are selected as described in greater detail above, to provide high distribution of the fibers 192 in the composite material 190, while at the same time inhibiting over mixing of the colorants 194 with the composite material. In this embodiment, the natural fibers 192 are metered into the extruder 102 at a rate of about 400 lb/hr or less to about 2000 lb/hr or more. The additives that may be introduced at this point into the extruder are usually much smaller in quantity, being in the range of 5 lb/hr to about 50 lb/hr. The exceptions being molder and/or cutter trim, which may be added at rates of about 50 lb/hr to about 300 lb/hr, and recycled carpet waste which may be added at rates of about 50 lb/hr to about 500 lb/hr. The recycled carpet waste may be in granule form, as described in U.S. Patent Application Publication No. 2008/0128933, the disclosure of which is hereby incorporated by reference herein in its entirety.

All the feeders, both for the main entry port and for secondary port(s), are controlled through a programmable logic controller 180. Additionally, the controller 180 also controls the coextruders 300 and related components, as well as the downstream components (e.g., the puller 318, saws 320, etc.). The amount of each material added is controlled for optimum formulation control, allowing for the use of specific materials in specific amounts to control the physical properties of the extruded composite product.

The composite material is gradually cooled from the temperature when exiting the first mixing region 170 to a temperature of about 170° C. to about 180° C. as it is conveyed along the second mixing region 172 towards the extrusion die 140. This cooling allows the fibers 192 to mix with the molten composite material 190 without being burned or destroyed by the process temperatures. The material is compressed as it is conveyed from zone Z11 to zone Z12, thus allowing pressure to build-up, e.g., between about 7 bar to about 30 bar at the extruder exit and increased to 10 bar to 80 bar at the melt pump exit, in order to force the material through the die. In one embodiment, an adapter and melt pump are located at the distal end 126 of the extrusion system 100. The melt pump levels pressure of the extruded material within the system 100. Table A-1 also depicts the temperature and pressure ranges of the material at the melt pump. The composite material is then fed into the Y-block adaptor (if present) where it is heated to a temperature of about 165° C. and split into two separate flows, which are forced through corresponding extrusion ports 142a, 142b of the extrusion die 140 to form a pair of extruded composite profiles to be coextruded with a capstock. The coextrusion die 312 is located at the exit face 140a, 140b (as depicted in FIG. 6) of each extrusion die 140, and is described in more detail below. Similarly, the internal pressure in the die(s) depends on whether the extrusion is being done on a single die or double die arrangement.

Figure 7A:
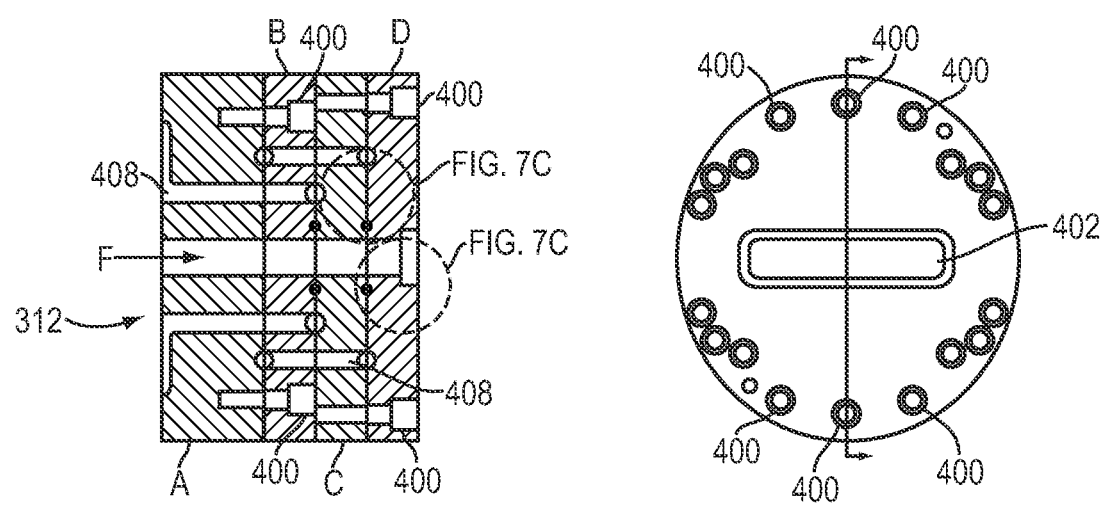
FIG. 7A depicts side section and front views of a coextrusion die assembly used in a system for forming a capstocked fiber-plastic composite extrusion in accordance with another embodiment of the present invention.
Figure 7B:
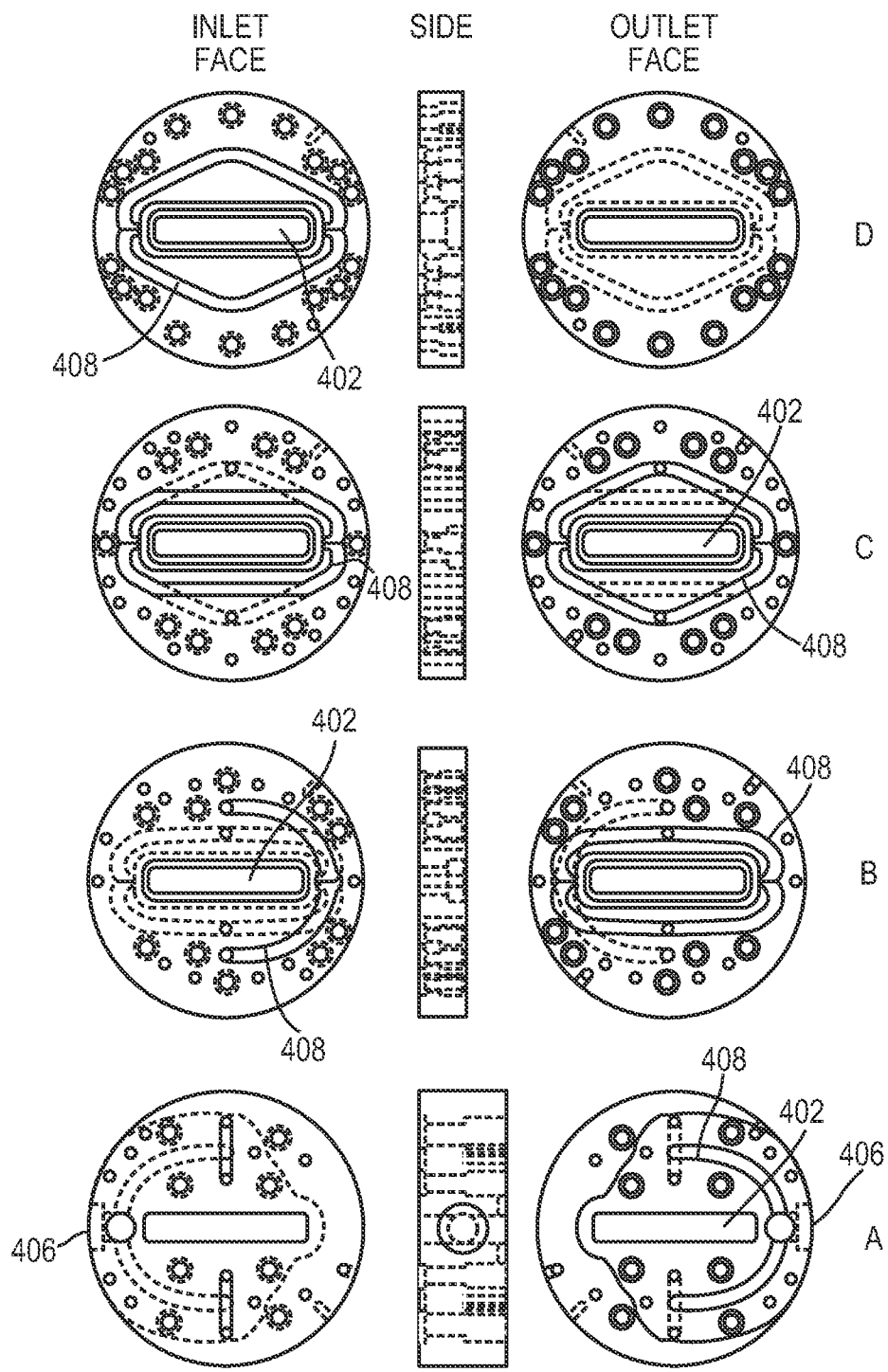
FIG. 7B depicts inlet, side section, and outlet views of the plates of the coextrusion die assembly of FIG. 7A.
Figure 7C:
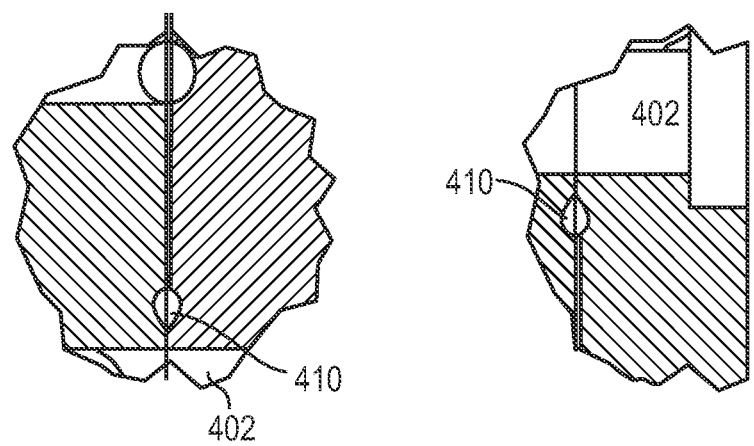
FIG. 7C depicts enlarged partial side section views of the coextrusion die assembly of FIG. 7A.

FIGS. 7A-7C are various views of a coextrusion die 312 in accordance with one embodiment of the invention. The coextrusion die 312 is a laminated four plate die with discrete sections A-D. Certain holes 400 in each die section accommodate bolts or locator pins to align the individual sections. Each section of the die 312 defines a channel 402 sized to accommodate the extruded core material, which flows through the die 312 in a direction F. Two coextrusion dies are used. The inlet face of section A is secured to the exit face 140a, 140b of each extrusion die 140. Molten capstock material is introduced to the die 312 via an inlet 406 in section A. The molten capstock material flows through a plurality of channels 408. Each channel 408 corresponds generally to a matching channel 408 on an adjacent abutting section of the die 312. For example, the channel configuration on the outlet face of section B corresponds substantially to the channel configuration on the inlet face of section C. Ultimately, the molten capstock material is introduced to the extruded core material at locations 410 at the interfaces between sections B and C and sections C and D and metered onto the passing outer surfaces of the core extrudate. These locations 410 are shown in more detail in the enlarged partial figures depicted in FIG. 7C, as indicated by the circular overlays designated FIG. 7C in FIG. 7A.

A number of potential capstock formulations were prepared and tested to determine performance characteristics. Tables B-1A and B-1B identify a number of formulations prepared in accordance with the invention. Formulations are provided in percentage of each component, by weight of the total formulation. Particular sample formulations are identified by "ID#." Samples FCI 1000-FCI 1013, and FCI 1008B utilize one of three acid copolymer precursors and a zinc masterbatch (MB) to produce the ionomer capstock. The masterbatch used with all depicted formulations was CRY ZNCON (Lot 4501). Two of these sample formulations were finished ionomers: samples FCI 1000 and Surlyn 9910, manufactured by DuPont. High density polyethylene, manufactured by Chevron Phillips, as product 6007 HDPE/0760-01, was introduced to certain ionomer samples at the percentages identified in the Tables. Other additives, such as calcium sulfate, color, and antistatic additives were also added. It has been observed that some capstock materials display an affinity for dust attraction, which is then difficult to clean off. It is believed that this may be to the presence of unreacted acid in the ionomer. Calcium sulfate (e.g., gypsum) may be added to the formulation to mimic the dust and bind to the reactive acid sites. Antistatic additives may also reduce dust attraction by reducing any residual static charge on the capstock material.

Test results for the various sample formulations are also provided in Tables B-1A and B-1B. ASTM standard tests were performed to obtain the results identified below: Melt Index Test (ASTM D-1238); Shore D Hardness Test (ASTM D-2240); Gardner Impact Test (ASTM D-5420); Tensile Strength Test (ASTM D-412); Elongation Test (ASTM D-412); and Flexural Modulus Test (ASTM D-790). In sum, samples that utilize finished ionomers (i.e., Surlyn 9910, and FCI 1000) produce more desirable results, likely due to the presence of fewer additives.

TABLE B-1A

Exemplary Ionomer Formulations, Pt. 1

| | FCI 1000 | FCI 1001 | FCI 1002 | FCI 1003 | FCI 1004 | FCI 1005 | FCI 1006 | FCI 1007 | FCI 1008 |
|---|---|---|---|---|---|---|---|---|---|
| Acid Copoly. Precursors | | | | | | | | | |
| Dupont Nucrel 960 | 88.3 | 55.9 | — | — | — | — | — | 55.9 | 43.4 |
| Exxon Escor AT 310 | — | — | 96.0 | 61.4 | 48.0 | — | — | — | — |
| Dow XUS60758.08L | — | — | — | — | — | 88.3 | 55.9 | — | — |
| Zinc Masterbatch (MB) | 11.7 | 8.1 | 4.0 | 2.6 | 2.0 | 11.7 | 8.1 | 8.1 | 6.6 |
| Finished Ionomers | | | | | | | | | |
| Dupont Surlyn 9910 | — | — | — | — | — | — | — | — | — |
| FCI 1000 | — | — | — | — | — | — | — | — | — |
| Sub-Total (Zn Ionomer) | 100.0 | 64.0 | 100.0 | 64.0 | 50.0 | 100.0 | 64.0 | 64.0 | 50.0 |
| 6007 HDPE/0760-01 | — | 36.0 | — | 36.0 | 50.0 | — | 36.0 | 36 | 50.0 |
| Additives | | | | | | | | | |
| Calcium Sulfate | — | — | — | — | — | — | — | — | — |
| Mosaic Color MB | — | — | — | — | — | — | — | 6.7 | 6.7 |
| Antistatic Additive | — | — | — | — | — | — | — | — | — |
| Total | 100.0 | 100.0 | 100.0 | 100.0 | 100.0 | 100.0 | 100.0 | 106.7 | 106.7 |
| Test Results | | | | | | | | | |
| Melt Index "E" | 1.3 | 0.8 | 1.2 | 1.2 | 0.9 | 0.2 | 0.4 | 0.7 | 0.9 |
| Hardness "D" | 55 | 62 | 48 | 55 | 58 | 59 | 63 | 62 | 64 |
| Gardner Impact, in-lbs | 142 | 160 | 141 | 168 | 173 | 220 | 192 | 163 | 169 |
| Tensile Strength, psi | 3,220 | 2,125 | 1,375 | 1,875 | 2,170 | 2,290 | 2,390 | 3,200 | 3,440 |
| Elongation, % | 340 | 135 | 170 | 80 | 30 | 130 | 95 | 50 | 20 |
| Flexural Modulus, psi | 24,200 | 45,300 | NA | 26,850 | 39,400 | 31,800 | 53,000 | 47,400 | 56,300 |

TABLE B-1B

Exemplary Ionomer Formulations, Pt. 2

| | FCI 1009 | FCI 1010 | FCI 1011 | FCI 1012 | FCI 1008B | FCI 1013 | FCI1014 | FCI 1015 |
|---|---|---|---|---|---|---|---|---|
| Acid Copoly. Precursors | | | | | | | | |
| Dupont Nucrel 960 | — | 42.6 | 40.25 | 41.11 | 41.55 | 22.85 | — | — |
| Exxon Escor AT 310 | — | — | — | — | — | — | — | — |
| Dow XUS60758.08L | 56.1 | — | — | — | — | — | — | — |
| Zinc Masterbatch (MB) | 7.9 | 6.2 | 6.40 | 5.45 | 5.51 | 3.03 | — | — |
| Finished Ionomers | | | | | | | | |
| Dupont Surlyn 9910 | — | — | — | — | — | — | 25.88 | — |
| FCI 1000 | — | — | — | — | — | — | — | 25.88 |
| Sub-Total (Zn Ionomer) | 64.0 | 48.8 | 46.65 | 46.56 | 47.06 | 25.88 | 25.88 | 25.88 |
| 6007 HDPE/0760-01 | 36 | 39.9 | 46.65 | 46.56 | 47.06 | 68.24 | 68.24 | 68.24 |
| Additives | | | | | | | | |
| Calcium Sulfate | — | 5.0 | — | — | — | — | — | — |
| Mosaic Color MB | 6.7 | 6.3 | 6.70 | 5.88 | 5.88 | 5.88 | 5.88 | 5.88 |
| Antistatic Additive | — | — | — | 1.00 | — | — | — | — |
| Total | 106.7 | 100.0 | 100.00 | 100.00 | 100.00 | 100.00 | 100.00 | 100.00 |
| Test Results | | | | | | | | |
| Melt Index "E" | 0.7 | 0.9 | 0.90 | 0.25 | 0.90 | 0.90 | | |
| Hardness "D" | 63 | 64.0 | 71.00 | — | | | | |
| Gardner Impact, in-lbs | 182 | 170.0 | 200.00 | — | | | | |
| Tensile Strength, psi | 3,600 | 3200.0 | 3675.00 | — | | | | |
| Elongation, % | 86 | 300.0 | 13.00 | — | | | | |
| Flexural Modulus, psi | 77,400 | 59000.0 | 72000.00 | — | | | | |

Table B-2 depicts exemplary formulations of an ionomer capstock utilizing increasing percentages of HDPE. Performance data (in accordance with the ASTM standard tests described above with regard to Tables B-1A and B-1B) are also provided. Property target data information is also provided. The property targets identify properties indicative of complete ionomerization reactions. One notable trend relates to the increase adhesion data as the percentage of HDPE in the formulation is increased.

Table C-1 depicts the ranges of various components that may be utilized in capstocked composite formulations in accordance with the present invention. The ranges provided in Table C-1, and all the tables herein, are approximate; acceptable ranges may be lower and higher than those actually enumerated. Any of the ionomer formulations depicted in Tables B-1A, B-1B, and B-2 may be utilized in the capstocked wood-plastic composites or solely plastic cores described herein. Specifically, materials introduced via the

TABLE B-2

Ionomer/HDPE Capstock Formulations

| | EXP 019 | EXP 020 | EXP 021 | EXP 022 | EXP 023 | Property Targets |
|---|---|---|---|---|---|---|
| HDPE percentage | 50% | 60% | 70% | 80% | 90% | |
| Acid Copoly. Precursor | | | | | | |
| CRY 6015 (lot 9272-1) | 40.85 | 32.68 | 24.51 | 16.34 | 8.17 | |
| Zinc Masterbatch (MB) | 6.21 | 4.97 | 3.73 | 2.48 | 1.24 | |
| Sub-Total (Zn Ionomer) | 47.06 | 37.65 | 28.24 | 18.82 | 9.41 | |
| 6007 HDPE (Lot 11-7159-9) | 47.06 | 56.47 | 65.88 | 75.30 | 84.71 | |
| Additive | | | | | | |
| Color (Mosaic Brick MB M764) | 5.88 | 5.88 | 5.88 | 5.88 | 5.88 | |
| Total | 100.00 | 100.00 | 100.00 | 100.00 | 100.00 | |
| Test Results | | | | | | |
| Melt Index "E" (Gms/10 Min.) | 0.8 | 0.9 | 0.9 | 0.7 | 0.7 | 0.85 |
| Hardness "D" | 64 | 68 | 68 | 69 | 68 | 62 Min. |
| Gardner Impact, in-lbs @ RT | 167 | 176 | 186 | 185 | 180 | 150 Min. |
| Gardner Impact, in-lbs @ −20 C. | 188 | 198 | 196 | 190 | 192 | 100 min. |
| Tensile Strength, psi | 3,430 | 3,200 | 3,190 | 3,090 | 3,300 | 3,400 Min. |
| Elongation, % | 27 | 25 | 18 | 10 | 11 | 20 Min. |
| Flexural Modulus, psi | 45,900 | 55,100 | 57,500 | 62,750 | 82,000 | 50,000 | main feed may include HDPE pellets (as a base polymer), lubricants, and colorants. Other components, such as regrind (in pulverized or flake form), repro, and/or recycled polymers to replace at least a portion of the HDPE pellets used in the base polymer, also may be introduced via the main feed. The regrind material is post-industrial or post-consumer polyethylene materials or a combination of the two. The repro is reprocessed extrusion materials generated in the production of the extruded product. The recycled polymer may be recycled carpet waste, plastic bags, bottles, etc. The side feed, located downstream from the main feed, may be utilized to introduce wood filler and other additives, if desired.

TABLE C-1

Formulations for Extruded Composites with Coextruded Capstock

| Material | Range Low % | Range High % |
|---|---|---|
| MAIN EXTRUDER | | |
| Main Feed | | |
| Base Polymer Pellet | 1 | 100 |
| Regrind (Pulverized) | 0 | 50 |
| Regrind (Flake) | 0 | 20 |
| Repro | 0 | 15 |
| Lubricant | 0 | 7 |
| Color | 0 | 2 |
| Side Feed | | |
| Wood Filler | 0 | 70 |
| CO-EXTRUDER | | |
| Co-Extruder | | |
| Ionomer | 1 | 100 |
| Base Polymer Pellet | 0 | 99 |
| Color incl. UV/AO | 0 | 4 |
| Variegated Colors | 0 | 4 |
| Wood filler | 0 | 25 |
| Biocide | 0 | 2 |
| Fire Retardant | 0 | 15 |
| Other additives | 0 | 10 |

It has been discovered that, surprisingly, ionomer capstocks, as described herein, may be coextruded with WPCs to produce an extruded product having enhanced performance and appearance characteristics, without the need to alter the formulation of the standard, core wood-plastic composite, and can be processed in the extruder using the same screw profiles and zone parameters. Additionally, specific examples of capstocked WPCs manufactured in accordance with the component ranges of Table C-1 and the process ranges of Table A-1 are depicted in Tables D-1, D-2A, and D-2B.

Table C-1 illustrates the range of individual components that may be used to produce acceptable capstocked WPCs. Notably, ionomer capstock may include between about 1% to about 100% ionomer, by weight. Other embodiments of the ionomer capstock may include between about 20% to about 80% ionomer by weight, between about 50% to about 70% ionomer by weight, and about 60% to about 68% ionomer by weight. HDPE pellet (as the base polymer) may comprise between about 0% to about 99% by weight, of the capstock; about 20% to about 80%, by weight, of the capstock; about 30% to about 60%, by weight, of the capstock; and about 30% to about 50%, by weight, of the capstock. Other embodiments comprise between about 32% to about 40% HDPE pellet by weight, of the capstock. An embodiment of the capstock formulation utilizing about 27.5% ionomer and about 72.5% HDPE has displayed particularly desirable commercial properties. In this last formulation, adhesion is very high, while scratch resistance and ability to withstand damage is not severely impacted.

Further, different types of lubricant perform equally well in the processing. For example, where both a "one-pack" or combined specialty lubricant (e.g., Struktol 801) is used as well as a more conventional individual lubricant package (e.g., zinc stearate, EBS wax, etc.), the invention processed acceptably, regardless of the lubricant approach to formulating. Within the ranges of components depicted in Table C-1, certain formulations have proven particularly desirable for commercial purposes. One such embodiment of the core material is about 47.5% polymer, about 5% lubricant, about 1% color, and about 46.5% wood filler. The capstock material for this embodiment is about 61.5% ionomer, about 34.6% HDPE pellet, and about 3.9% color.

Figure 8:
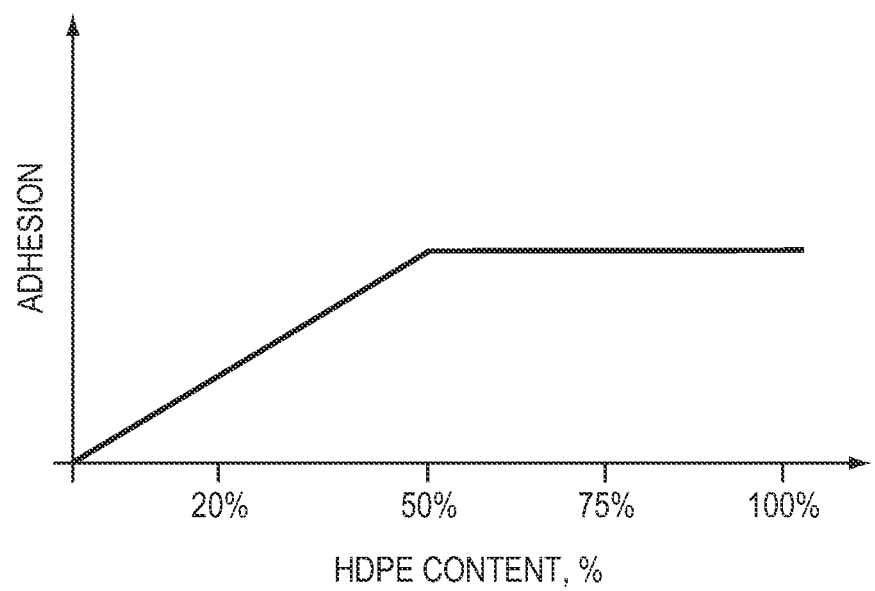
FIG. 8 depicts a relationship of capstock ionomer/polymer formulation to adhesion strength.

It has also been determined that high percentages of capstock polymer used in the formulation results in increased adhesion, even while retaining acceptable weatherability. FIG. 8 depicts this relationship between percentage of HDPE in the formulation and adhesion strength. Notably, while adhesion increases steadily as HDPE is increased, capstock formulations having HDPE amounts in excess of 50% display little, if any, improvement in adhesion.

The downstream mechanical operations, beyond the coextruder die arrangement, follow the same pattern as the formulation and processing conditions, in that, the coextruded, capstocked composite has minimal effect on processing of the final product relative to the uncapstocked, wood-plastic composite. The extruded product can be cut using conventional traveling saw or other equipment. Likewise, the extruded board can be molded and/or embossed using standard equipment. In the case of molding, a blade cutter can be used to change the surface appearance to a grooved or sanded appearance. These formulations also are capable of being hot surface embossed. An embossing roll using either an internal hot oil system to heat the surface of the embossing roll or an infra-red heating system to heat the roll surface both emboss the board, or ambient temperature roll surfaces may be pressed on a hot co-extrusion surface.

Coextruded composite formulations yield equivalent flexural strength and stiffness to the standard uncapstocked composites. Upon extrusion and cooling, the finished composite materials may be tested and inspected to ensure acceptable performance and geometry. Multiple parameters may be evaluated, including visual appearance, dimensional control, physical properties, water absorption, etc.

Visually, the composites are inspected for cracks along the edges or gaps within the material internally (e.g., the composites may be cut, bored, etc., to confirm consistent distribution of the materials, adhesion of the capstock, etc.). Dimensional control inspections, both static and when subject to loading, determine whether the composites adequately resist warping, bending, or twisting. Samples may be tested, for example under ASTM-D790, to determine specific physical properties, such as stress, displacement, modulus of elasticity, and load.

EXAMPLES

Table D-1 depicts three ionomer capstocked WPCs manufactured in accordance with the invention. The core material includes HDPE pellets, reprocessed polyethylene, regrind (recycled polyethylene), Struktol 801, and color. Maple wood flour is added to the polymer mixture, which is then coextruded with a capstock. The core formulation for each of the three samples 9318A, 9318B, and 9318C is identical. Each sample includes a different capstock. All three samples utilize a base capstock material of 37% HDPE and 63% Surlyn 9910, manufactured by DuPont. Dupont Fusabond A and B were added to samples 9318B and 9318C, respectively, as adhesion promoters. Interestingly, the adhesion value of sample 9318A was higher than those of the other samples that incorporated adhesion promoters. This is likely because the bond formed by the HDPE content in the capstock material is a stronger bond than the bond formed by the additives. Additional test results are depicted in Table D-1, and were performed in accordance with ASTM D-198.

The samples were subjected to a Hot Water Exposure Test that included subjecting the capstocked WPC samples to boiling water for 24 hours and evaluating any change in appearance. Additionally, the samples were subjected to a Soak/Freeze/Thaw Test that included subjecting the capstocked WPC samples to immersion in water at ambient temperature for 3 hours. Thereafter, the samples were frozen for 3 hours, then allowed to thaw at ambient for up to 12 hours. In this test, ambient temperatures are between about 68° F. and about 78° F. The capstocked samples very low water absorption properties, especially when compared to uncapstocked WPCs. For example, capstocked WPCs display significantly less water damage after a one-day Hot Water Exposure Test. Unlike the capstocked WPCs, the ends and edges of uncapstocked WPCs degrade, fray, and absorb moisture. Visual results of Soak/Freeze/Thaw Test display similar differences, where the uncapstocked WPCs experience significant cracking, cupping, and degradation. While some cracking appears in the capstocked WPCs after an identical Soak/Freeze/Thaw Test, it is significantly reduced. It was expected that the uncapstocked WPC would be able to retain its shape better than the capstocked WPC, since it could expand freely in all directions. Accordingly, it is surprising that the capstocked WPC was able to withstand better the testing procedures.

Mold and mildew resistance is improved over uncapstocked WPCs through the use of biocides, which need only be incorporated into the capstock on the surface of the composite core. In addition, ultra-violet and oxygen stabilizers can be used to protect the pigmentation of the capstock compound, allowing for improved aging properties of the capstocked WPC.

TABLE D-1

Co-extruded Capstocked Materials With and Without Adhesion Promoters

| | Production Board Control | | Adhesion Trial | | Adhesion Trial | |
|---|---|---|---|---|---|---|
| | FC 9318A | | FC 9318B | | FC 9318C | |
| Material | lb. | % | lb. | % | lb. | % |
| Main Feed | | | | | | |
| HDPE Pellet | 40.0 | 13.9 | 40.0 | 13.9 | 40.0 | 13.9 |
| Same Color Repro | 130.0 | 45.1 | 130.0 | 45.1 | 130.0 | 45.1 |
| Mixed Color Repro | 0.0 | 0.0 | 0.0 | 0.0 | 0.0 | 0.0 |
| Regrind PE | 30.0 | 10.4 | 30.0 | 10.4 | 30.0 | 10.4 |
| Struktol 801 | 12.0 | 4.2 | 12.0 | 4.2 | 12.0 | 4.2 |
| Color | 3.0 | 1.0 | 3.0 | 1.0 | 3.0 | 1.0 |
| Side Feed | | | | | | |
| Maple | 73.1 | 25.4 | 73.1 | 25.4 | 73.1 | 25.4 |
| Total Board | 288.1 | 100.0 | 288.1 | 100.0 | 288.1 | 100.0 |
| Capstock | | | | | | |
| Base Capstock Material | 15.5 | 100.0 | 14.6 | 94.2 | 14.6 | 94.2 |
| Dupont Fusabond A | | 0.0 | 0.9 | 5.8 | | 0.0 |
| Dupont Fusabond B | | 0.0 | | 0.0 | 0.9 | 5.8 |
| Total Capstock | 15.5 | 300.0 | 15.5 | 294.2 | 15.5 | 294.2 |
| TOTAL | 303.6 | | 303.6 | | 303.6 | |
| Rate, lb./hr. | 2550 | good | 2550 | good | 2550 | good |
| Stress, psi | | 2793 | | 2873 | | 2842 |
| Displ., in. | | 2.480 | | 2.444 | | 2.493 |
| MOE, psi | | 515271 | | 543606 | | 572149 |
| Load, lbf | | 525 | | 544 | | 543 |
| Pull out, psi | 380 | | 260 | | 260 | |

Tables D-2A and D-2B depict six ionomer capstocked WPCs manufactured in accordance with the present invention. In addition to the components described above with regard to Table D-1, several samples incorporate additional components. Instead of the DuPont Fusabond materials as adhesion promoters, the examples depicted in Tables D-2A and D-2B use DuPont Nucrel or DuPont Alvaloy (an ethylene vinyl alcohol). Additionally, two examples using Struktol ionomers are also presented. Notably, the two formulations that include the Struktol ionomers displayed such a high adhesion that the capstock material began to tear and fail well before separation of the capstock and core material occurred.

TABLE D-2A

Co-extruded Capstocked Materials With Adhesion Promoters

| | Product Description | | | | | |
|---|---|---|---|---|---|---|
| | Production Board Control | | Adhesion Trial | | Adhesion Trial | |
| | FC 9722A | | FC 9722B | | FC 9722C | |
| Material | lb. | % | lb. | % | lb. | % |
| Main Feed | | | | | | |
| HDPE Pellet | 40.0 | 13.9 | 40.0 | 13.9 | 40.0 | 13.9 |
| Same Color Repro | 130.0 | 45.1 | 130.0 | 45.1 | 130.0 | 45.1 |
| Mixed Color Repro | 0.0 | 0.0 | 0.0 | 0.0 | 0.0 | 0.0 |
| Regrind PE | 30.0 | 10.4 | 30.0 | 10.4 | 30.0 | 10.4 |
| Struktol 801 | 12.0 | 4.2 | 12.0 | 4.2 | 12.0 | 4.2 |
| Color | 3.0 | 1.0 | 3.0 | 1.0 | 3.0 | 1.0 |
| Side Feed | | | | | | |
| Maple | 73.1 | 25.4 | 73.1 | 25.4 | 73.1 | 25.4 |
| Total Board | 288.1 | 100.0 | 288.1 | 100.0 | 288.1 | 100.0 |
| Capstock | | | | | | |
| Base Capstock Material | 14.7 | 94.8 | 14.0 | 90.3 | 14.7 | 94.8 |
| DuPont Fusabond A | | 0.0 | | 0.0 | | 0.0 |
| DuPont Fusabond B | | 0.0 | | 0.0 | | 0.0 |
| DuPont Nucrel 960 | 0.8 | 5.2 | 1.5 | 9.7 | | 0.0 |
| DuPont Elvaloy | | 0.0 | | 0.0 | 0.8 | 5.2 |
| Struktol SA 0915 | | 0.0 | | 0.0 | | 0.0 |
| Struktrol SA FR | | | | | | |
| Total Capstock | 15.5 | 294.8 | 15.5 | 290.3 | 15.5 | 294.8 |
| TOTAL | 303.6 | | 303.6 | | 303.6 | |
| Rate, lb./hr. | 2550 | good | 2550 | good | 2550 | good |
| Stress, psi | | 2793 | | 2873 | | 2842 |
| Displ., in. | | 2.480 | | 2.444 | | 2.493 |
| MOE, psi | | 515271 | | 543606 | | 572149 |
| Load, lbf | | 525 | | 544 | | 543 |
| Pull off, psi | 399 | | 389 | | 368 | |
| Adhesion, pounds | 78 | | 76 | | 72 | |
| Capstock Mat'l Failure | No | | No | | No | |

TABLE D-2B

Co-extruded Capstocked Materials With Adhesion Promoters

| | Product Description | | | | | |
|---|---|---|---|---|---|---|
| | Production Board Control | | Adhesion Trial | | Adhesion Trial | |
| | FC 9722D | | FC 9722E | | FC 9722G | |
| Material | lb. | % | lb. | % | lb. | % |
| Main Feed | | | | | | |
| HDPE Pellet | 40.0 | 13.9 | 40.0 | 13.9 | 40.0 | 13.9 |
| Same Color Repro | 130.0 | 45.1 | 130.0 | 45.1 | 130.0 | 45.1 |
| Mixed Color Repro | 0.0 | 0.0 | 0.0 | 0.0 | 0.0 | 0.0 |
| Regrind PE | 30.0 | 10.4 | 30.0 | 10.4 | 30.0 | 10.4 |
| Struktol 801 | 12.0 | 4.2 | 12.0 | 4.2 | 12.0 | 4.2 |
| Color | 3.0 | 1.0 | 3.0 | 1.0 | 3.0 | 1.0 |
| Side Feed | | | | | | |
| Maple | 73.1 | 25.4 | 73.1 | 25.4 | 73.1 | 25.4 |
| Total Board | 288.1 | 100.0 | 288.1 | 100.0 | 288.1 | 100.0 |

TABLE D-2B-continued

Co-extruded Capstocked Materials With Adhesion Promoters

| | Production Board Control | | Adhesion Trial | | Adhesion Trial | |
|---|---|---|---|---|---|---|
| | FC 9722D | | FC 9722E | | FC 9722G | |
| Material | lb. | % | lb. | % | lb. | % |
| Capstock | | | | | | |
| Base Capstock Material | 14.0 | 90.3 | | 0.0 | | 0.0 |
| DuPont Fusabond A | | 0.0 | | 0.0 | | 0.0 |
| DuPont Fusabond B | | 0.0 | | 0.0 | | 0.0 |
| DuPont Nucrel 960 | | 0.0 | | 0.0 | | 0.0 |
| DuPont Elvaloy | 1.5 | | | 0.0 | | 0.0 |
| Struktol SA 0915 | | 0.0 | 15.5 | 100.0 | | 0.0 |
| Struktrol SA FR | | | | | 15.5 | |
| Total Capstock | 15.5 | 290.3 | 15.5 | 200.0 | 15.5 | 200.0 |
| TOTAL | 303.6 | | 303.6 | | 303.6 | |
| Rate, lb./hr. | 2550 | good | 2550 | good | 2550 | good |
| Stress, psi | | 2793 | | 2873 | | 2842 |
| Displ., in. | | 2.480 | | 2.444 | | 2.493 |
| MOE, psi | | 515271 | | 543606 | | 572149 |
| Load, lbf | | 525 | | 544 | | 543 |
| Pull off, psi | 466 | | 471 | | 460 | |
| Adhesion, pounds | 92 | | 93 | | 90 | |
| Capstock Mat'l Failure | No | | Yes | | Yes | |

What is claimed is:

1. A coextruded composite profile adapted for use as a building material, the coextruded composite profile comprising:
   a wood-plastic composite core comprising a base polymer and a natural fiber in a mixture; and
   a capstock layer disposed over at least a portion of the wood-plastic composite core, the capstock layer comprising an ionomer and a capstock polymer different from the ionomer in a mixture,
   wherein (i) the base polymer and the capstock polymer each is selected from the group consisting of polypropylene, polyethylene, and combinations thereof, (ii) the capstock polymer is present in the capstock layer in an amount between 72.5% and about 99%, by weight, and (iii) the capstock layer is characterized by an absence of natural fiber.

2. The coextruded composite profile of claim 1, wherein the natural fiber is selected from the group consisting of wood chips, wood flour, wood flakes, sawdust, flax, jute, hemp, kenaf, rice hulls, abaca, and combinations thereof.

3. The coextruded composite profile of claim 1, wherein the base polymer comprises a first polymer and the capstock polymer comprises the first polymer.

4. The coextruded composite profile of claim 3, wherein the first polymer is HDPE.

5. The coextruded composite profile of claim 1, wherein the capstock layer further comprises an additive.

6. The coextruded composite profile of claim 5, wherein the additive comprises at least one of a colorant, a UV stabilizer, an antioxidant, a biocide, and a fire retardant.

7. The coextruded composite profile of claim 6, wherein the colorant comprises a variegated colorant.

8. The coextruded composite profile of claim 1, wherein the core comprises about 1% to about 100% base polymer, by weight.

9. The coextruded composite profile of claim 8, wherein the core comprises about 46% base polymer, by weight.

10. The coextruded composite profile of claim 1, wherein the capstock layer comprises at least about 1% ionomer, by weight.

11. The coextruded composite profile of claim 1, wherein the capstock layer comprises at least about 20% ionomer, by weight.

12. The coextruded composite profile of claim 1, wherein the capstock layer comprises 27.5% ionomer, by weight.

13. The coextruded composite profile of claim 1, wherein the capstock layer comprises 72.5% capstock polymer, by weight.

14. The coextruded composite profile of claim 1, wherein the capstock layer comprises a thickness of about 0.012 inches to about 0.040 inches.

15. The coextruded composite profile of claim 14, wherein the capstock layer comprises a thickness of about 0.015 inches to about 0.020 inches.

16. The coextruded composite profile of claim 1, wherein the capstock layer is bonded directly to at least one side of the core.

17. The coextruded composite profile of claim 1, wherein the capstock layer is bonded to more than one side of the wood-plastic composite core.

18. The coextruded composite profile of claim 1, wherein the polyethylene is selected from the group consisting of HDPE, MDPE, LDPE, LLDPE, and combinations thereof.

19. A method of manufacturing a coextruded composite adapted for use as a building material, the method comprising the steps of:
   providing a base polymer;
   providing a natural fiber;

mixing and heating the base polymer and the natural fiber to produce a base mixture comprising a wood-plastic composite melt blend;

providing an ionomer;

providing a capstock polymer different from the ionomer;

mixing and heating the ionomer and the capstock polymer to produce a capstock mixture comprising a melt blend, wherein (i) the base polymer and the capstock polymer each is selected from the group consisting of polypropylene, polyethylene, and combinations thereof, (ii) the capstock polymer is present in the capstock mixture in an amount between 72.5% and about 99%, by weight, and (iii) the capstock mixture is characterized by an absence of natural fiber; and coextruding the capstock mixture onto at least a portion of the base mixture through a die to form a coextruded profile comprising a capstock layer disposed over at least a portion of a wood-plastic composite core.

20. The method of claim 19, wherein the base polymer comprises a first polymer and the capstock polymer comprises the first polymer.

21. The method of claim 20, wherein the first polymer is HDPE.

22. The method of claim 19, further comprising the steps of:

providing an additive; and mixing and heating the ionomer, the capstock polymer, and the additive to produce a capstock mixture comprising a melt blend.

23. The method of claim 22, wherein the additive comprises at least one of a colorant, a UV stabilizer, an antioxidant, a biocide, and a fire retardant.

24. The method of claim 19, further comprising the step of cooling the coextruded profile.

25. The method of claim 24, wherein the step of cooling comprises passing the coextruded profile through a liquid.

26. The method of claim 25, wherein the liquid comprises at least one of a water and a coolant.

27. The method of claim 19, wherein the capstock mixture comprises at least about 1% ionomer, by weight.

28. The method of claim 19, wherein the capstock mixture comprises at least about 20% ionomer, by weight.

29. The method of claim 19, wherein coextruding the capstock mixture comprises bonding the capstock mixture to more than one side of the base mixture.

30. The method of claim 19, wherein the polyethylene is selected from the group consisting of HDPE, MDPE, LDPE, LLDPE, and combinations thereof.

* * * * *